3,158,601
5α-PREGNENO-[3,2-c] PYRAZOLES AND PROCESS
OF PREPARING THEM
Paul Buchschacher, Plainfield, and Ralph F. Hirschmann,
Scotch Plains, N.J., assignors to Merck & Co., Inc.,
Rahway, N.J., a corporation of New Jersey
No Drawing. Filed Oct. 26, 1962, Ser. No. 233,428
18 Claims. (Cl. 260—239.5)

This invention is concerned generally with novel 5α-pregnano-[3,2-c]pyrazole compounds, and with processes of preparing the same. More particularly, it relates to the novel 21-hydroxy-, 21-acyloxy-, 21-desoxy-, and 21-fluoro-17α-hydroxy-20-oxo-5α - pregnano-[3,2-c]pyrazole compounds and to processes of making these compounds starting from the corresponding 17α,21-dihydroxy-4-pregnene-3,20-dione.

These novel 5α-pregnano-[3,2-c]pyrazole compounds subject of the present invention, may be chemically represented by structures A and B:

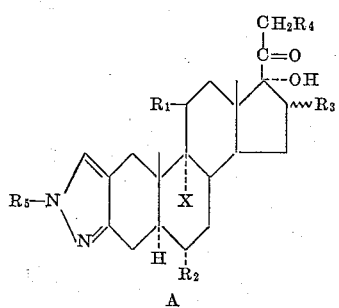

A

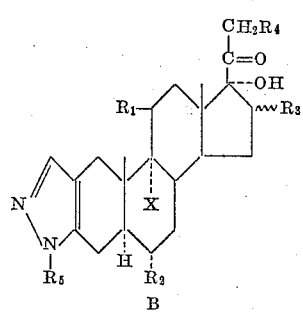

B wherein $R_1$ is hydrogen, β-halogen, β-hydroxy, or keto but β-halogen is present at $R_1$ only when X is halogen, $R_2$ is hydrogen, α-fluoro, or α-methyl, $R_3$ is hydrogen, α-methyl, β-methyl, or α-fluoro, $R_4$ is hydrogen, hydroxy, acyloxy or fluoro, $R_5$ is hydrogen, alkyl, cycloalkyl, aralkyl, aryl, a heterocyclic nucleus, or substituted derivatives thereof, and X is hydrogen or halogen, and wherein any acyl group present as an acyloxy group at $R_4$ may be the same or different from any acyl group present at $R_5$. N-substituted-pyrazole compounds having structure "A" are herein designated as the 1′-substituted-[3,2-c]pyrazoles, and N-substituted-pyrazole compounds having structure "B" are designated as the 2′-substituted-[3,2-c]pyrazoles.

The above defined [3,2-c]pyrazoles produced in accordance with the present invention possess high anti-inflammatory activity, and are especially effective for topical application and for the treatment of arthritis and related diseases since they can be administered for their cortisone-like action in low dosage thereby minimizing undesirable side effects.

In preparing our novel chemical compounds, the starting material utilized is a 17α,21-dihydroxy-4-pregnene-3,20-dione which may be identified by the following structural formula:

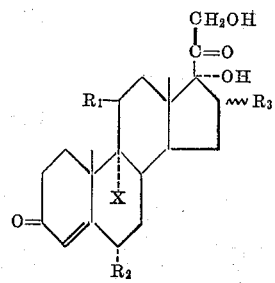

wherein $R_1$ is hydrogen, β-hydroxy or β-halogen, but β-halogen is present at $R_1$ only when X is halogen, $R_2$ is hydrogen, α-fluoro or α-methyl, $R_3$ is hydrogen, α-methyl, β-methyl or α-fluoro, and X is hydrogen or halogen. However, it is clear to those skilled in the art that other starting materials may be similarly converted to desired end products.

Among the compounds which may be used as a starting material in the process of our invention are:

11β,17α,21-trihydroxy-4-pregnene-3,20-dione
11β,17α,21-trihydroxy-16α-methyl-4-pregnene-3,20-dione
11β,17α,21-trihydroxy-16β-methyl-4-pregnene-3,20-dione
16α-fluoro-11β,17α,21-trihydroxy-4-pregnene-3,20-dione
11β,17α,21-trihydroxy-6α-methyl-4-pregnene-3,20-dione
11β,17α,21-trihydroxy-6α,16α-dimethyl-4-pregnene-3,20-dione
11β,17α,21-trihydroxy-6α,16β-dimethyl-4-pregnene-3,20-dione
16α-fluoro-11β,17α,21-trihydroxy-6α-methyl-4-pregnene-3,20-dione
6α-fluoro-11β,17α,21-trihydroxy-4-pregnene-3,20-dione
6α-fluoro-11β,17α,21-trihydroxy-16α-methyl-4-pregnene-3,20-dione
6α-fluoro-11β,17α,21-hydroxy-16β-methyl-4-pregnene-3,20-dione
6α,16α-difluoro-11β,17α,21-trihydroxy-4-pregnene-3,20-dione
9α-fluoro-11β,17α,21-trihydroxy-4-pregnene-3,20-dione
9α-fluoro-11β,17α,21-trihydroxy-16α-methyl-4-pregnene-3,20-dione
9α-fluoro-11β,17α,21-trihydroxy-16β-methyl-4-pregnene-3,20-dione
9α-fluoro-11β,17α,21-trihydroxy-16α-fluoro-4-pregnene-3,20-dione
9α-chloro-11β,17α,21-trihydroxy-4-pregnene-3,20-dione
9α-chloro-11β,17α,21-trihydroxy-16α-methyl-4-pregnene-3,20-dione
9α-chloro-11β,17α,21-trihydroxy-16β-methyl-4-pregnene-3,20-dione
9α-chloro-16α-fluoro-11β,17α,21-trihydroxy-4-pregnene-3,20-dione
9α-fluoro-11β,17α,21-trihydroxy-6α-methyl-4-pregnene-3,20-dione
9α-fluoro-11β,17α,21-trihydroxy-6α, 16α-dimethyl-4-pregnene-3,20-dione
9-fluoro-11β,17α,21-trihydroxy-6α,16β-dimethyl-4-pregnene-3,20-dione
9α,16α-difluoro-11β,17α,21-trihydroxy-6α-methyl-4-pregnene-3,20-dione
9α-chloro-11β,17α,21-trihydroxy-6α-methyl-4-pregnene-3,20-dione
9α-chloro-11β,17α,21-trihydroxy-6α,16α-dimethyl-4-pregnene-3,20-dione
9α-chloro-11β,17α,21-trihydroxy-6α,16β-dimethyl-4-pregnene-3,20-dione
9α-chloro-16α-fluoro-11β,17α,21-trihydroxy-6α-methyl-4-pregnene-3,20-dione 9α-chloro-11β,17α,21-trihydroxy-6α-fluoro-4-pregnene-3,20-dione 6α,9α-difluoro-11β,17α,21-trihydroxy-4-pregnene-3,20-dione 6α,9α-difluoro-11β,17α,21-trihydroxy-16α-methyl-4-pregnene-3,20-dione 6α,9α-difluoro-11β,17α,21-trihydroxy-16β-methyl-4-pregnene-3,20-dione 6α,9α-difluoro-11β,17α,21-trihydroxy-16α-fluoro-4-pregnene-3,20-dione 9-chloro-6α-fluoro-11β,17α,21-trihydroxy-4-pregnene-3,20-dione 9α-chloro-6α-fluoro-11β,17α,21-trihydroxy-16α-methyl-4-pregnene-3,20-dione 9α-chloro-6α-fluoro-11β,17α,21-trihydroxy-16β-methyl-4-pregnene-3,20-dione 9α-chloro-6α,16α-difluoro-11β,17α,21-trihydroxy-4-pregnene-3,20-dione and the 11-keto-analogues of the above compounds;

9α,11β-dichloro-17α,21-dihydroxy-4-pregnene-3,20-dione

9α,11β-dichloro-17α,21-dihydroxy-16α-methyl-4-pregnene-3,20-dione

9α,11β-dichloro-17α,21-dihydroxy-16β-methyl-4-pregnene-3,20-dione

9α,11β-dichloro-16α-fluoro-17α,21-dihydroxy-4-pregnene-3,20-dione

9α,11β-dichloro-6α-fluoro-17α,21-dihydroxy-4-pregnene-3,20-dione

9α,11β-dichloro-6α-fluoro-17α,21-dihydroxy-16-methyl-4-pregnene-3,20-dione

9α,11β-dichloro-6α-fluoro-17α,21-dihydroxy-16β-methyl-4-pregnene-3,20-dione

9α,11β-dichloro-6α,16α-difluoro-17α,21-dihydroxy-4-pregnene-3,20-dione

9α,11β-dichloro-17α,21-dihydroxy-6α-methyl-4-pregnene-3,20-dione,

9α,11β-dichloro-17α,21-dihydroxy-6α,16α-dimethyl-4-pregnene-3,20-dione 9,11β-dichloro-17α,21-dihydroxy-6α,16β-dimethyl-4-pregnene-3,20-dione 9α,11β-dichloro-16α-fluoro-17α,21-dihydroxy-6α-methyl-4-pregnene-3,20-dione and the 11-desoxy-analogs of the aforesaid compounds.

The above named starting materials for our invention can be prepared by the introduction of the various substituents namely the 16α-methyl-, 16β-methyl- 6α-methyl-, 6α-fluoro-, 9α-fluoro or the 9α-chloro groups into a 17α,21-dihydroxy - 4 - pregnene-3,20-dione according to known procedures capable of general application. More than one substituent may be introduced into the unsubstituted steroid in any order, although it is generally preferred to introduce a 9α-halogen substituent last. The 16α-fluoro-steroids are prepared according to the procedures described at the end of Example 2.

An 11β,17α,21-trihydroxy-4-pregnene-3,20-dione compound may be converted into the correspondingly substituted 9α,11β-dichloro-17α,21-dihydroxy-4-pregnene-3,20-dione compound by first dehydrating the 11β,17α,21-trihydroxy-4-pregnene-320-dione at the 9(11)-position to from the corresponding 9(11)-pregnene, then acetylating at the 21-position, and finally halogenating at the 9α,11β-positions, for example, following the detailed procedures given at the end of Example 3.

The 17α,21-dihydroxy - 4 - pregnene-3,20-dione compounds used as starting materials are hydrogenated to form the corresponding 17α,21-dihydroxy-5α-pregnane-3,20-dione compounds. In a preferred embodiment of my invention, the 4-pregnene is hydrogenated catalytically using 5% Pd/BaSO₄ as catalyst, at room temperature and a hydrogen pressure of about 30 pounds p.s.i. The product formed is predominantly the 5α-pregnane (A B trans) which may be mixed with some A B-cis formula. The 5α-pregnane may be separated, if necessary by chromatography and crystallization.

It has been found that the starting materials defined above, or the corresponding 5α-pregnane derivatives formed by the catalytic hydrogenation of these starting materials, will react with aqueous formaldehyde solutions in the presence of strong acid to form the corresponding 17α,20,20,21-bis(methylenedioxy)-compounds. For example, cold, concentrated HCl and formalin are added to a stirred suspension of the steroid in chloroform, cooled to about 0° C. The mixture is then allowed to come to room temperature and stirred for several hours to afford the corresponding 17a,20,20,21-bis(methylenedioxy)-derivative.

As an alternate route, the 17α,20,20-21-bis(methylenedioxy)-5α-pregnanes may be obtained by reduction of the corresponding 17α,20,20-21-bis(methylenedioxy)-4-pregnene compound. Reduction may be brought about by hydrogenation using a catalyst such as 5% Pd/BaSO₄, as described above, or by the use of a solution of lithium in ammonia.

In a preferred embodiment of our invention, the 11-keto-steroids are preferably prepared by oxidation of the corresponding 11β - hydroxy-17α,20,20-21-bis(methylenedioxy)-5α-pregnane-3-one, for example, with chromium trioxide in a non-aqueous base such as pyridine. If desired, however, the 17α,20,20-21-bis(methylenedioxy)-5α-pregnane-3,11-dione may be prepared directly by the reaction of the 17α,21-dihydroxy-5α-pregnane-3,11,20-trione with formaldehyde solution in the presence of an acid as described in the preceding step.

Upon treatment of a 11-desoxy-, 11β-hydroxy-, 9α,11β-dihalogen-, or 11-keto-17α,20,20,21-bis(methylenedioxy)-5α-preganne-3-one compound with an alkyl formate and sodium hydride in an inert atmosphere there is formed the corresponding 17α,20,20,21 - bis(methylenedioxy)-2-hydroxymethylene-5α-pregnane-3-one which has the following structure:

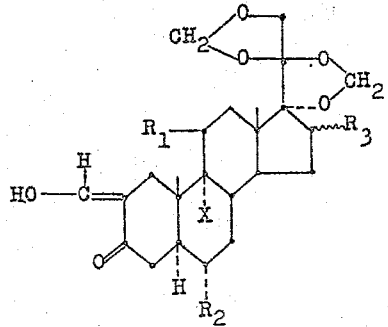

wherein R₁ is hydrogen, β-halogen, β-hydroxy and/or β-formyloxy-, or keto-, but β-halogen is present at R₁ only when X is halogen, and R₂, R₃, and X have the significance above defined. In a preferred embodiment of our invention, the steroid is dissolved in a solvent such as benzene and the resulting solution is cooled to room temperature and treated with ethyl formate. The air in the system is replaced with nitrogen, sodium hydride is added and the mixture is stirred at room temperature for several hours.

The 17α,20,20,21 - bis(methylenedioxy) - 2 - hydroxymethylene-5α-pregnane-3-one compound reacts with hydrazine in an inert atmosphere to form the corresponding 17α,20,20,21-bis(methylenedioxy)-5α-pregnano-[3,2-c]pyrazole.

Upon treatment of the 17α,20,20,21-bis(methylenedioxy)-2-hydroxymethylene - 5α-pregnane-3-one compound with a lower alkanol in the presence of an acidic reagent such as a p-toluenesulfonic acid the corresponding 17α,20,20,21 - bis(methylenedioxy) - 2 - alkoxymethylene-5α-pregnane-3-one is formed. When the latter compound is reacted with a monosubstituted hydrazine, the corresponding N - substituted-[3,2 - c]pyrazole compounds are formed. The N-substituted-[3,2-c]pyrazoles having structure "A" are designated as the 1'-substituted-[3,2-c]pyrazoles, and the N-substituted-pyrazole compounds having structure "B" are designated as the 2'-substituted-[3,2-c]pyrazoles.

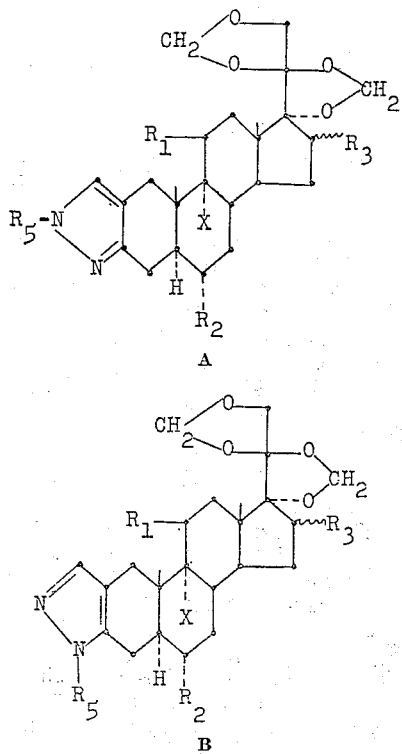

wherein $R_1$, $R_2$, $R_3$, and X have the significance above defined, and wherein $R_5$ is an alkyl, cycloalkyl, aralkyl, aryl, a heterocyclic nucleus, or substituted derivatives thereof. The products formed may be separated by chromatography.

Upon treatment of a 17α,20,20,21 - bis(methylenedioxy)-2-hydroxymethylene-5α - pregnane-3-one compound directly with a monosubstituted arylhydrazine, without the intermediate formation of the 2-alkoxy-methylene-derivative, one isomer is generally formed in preponderant amounts, whereas when reacting the 17α,20,20,21-bis(methylenedioxy)-2-alkoxymethylene - 5α - pregnane-3-one compound with a monosubstituted arylhydrazine, significant amounts of both isomers are obtained. When these reactions take place with monosubstituted alkylhydrazines, mixtures may be obtained when starting with the 2-hydroxymethylene-steroid as well as with the 2-alkoxymethylene-steroid. A mixture of isomers may also result from the reaction of a monosubstituted hydrazine with a 2-hydroxymethylene-compound which possibly contains variable amounts of the 2-alkoxymethylene-derivative due to the operating procedures employed, for example, due to recrystallization in the presence of alcohol a solution of the 2-hydroxymethylene-compound from which said acid has not been completely removed.

Among the monosubstituted hydrazines which may be used for the process of our invention are: alkylhydrazines, such as methylhydrazine, ethylhydrazine, propylhydrazines, butylhydrazines, β-hydroxyethylhydrazine; cycloalkylhydrazines; arylhydrazines which may be derived from any aromatic nucleus including phenylhydrazine and the substituted phenylhydrazines, such as o-, m-, and p-halophenylhydrazines, o-, m-, and p-tolyhydrazine, o-, m-, and p-alkoxyphenylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine, oxide, and 2-hydrazinopyrimidine, 2-hydrazinothiophene, 3-hydrazinothiophene; aralkylhydrazines, such as benzylhydrazine and phenylethylenehydrazine.

There are thus produced the corresponding N-substituted-4-pregneno-[3,2-c]pyrazoles including: N-alkyl such as N-methyl-, N-ethyl-, N-butyl-, N-propyl, N-(β-hydroxyethyl)-; N-cycloalkyl-; N-aryl- which may be derived from any aromatic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N-(1''-naphthyl)-, N-(2''-pyridyl)-, N-(3''-pyridyl)-, N-4''-pyridyl)-, N-(4''-pyridyloxide)-, N-(2''-pyrimidyl), N(2''-thiophene)-, N-(3''-thiophene)-, N-aralkyl-, such as N-benzyl- and N-phenylethenyl-[3,2-c]pyrazoles.

The N-alkyl-[3,2-c]pyrazoles may also be prepared by direct alkylation of the N-unsubstituted [3,2-c]pyrazoles.

A 17α, 20, 20, 21-bis(methylenedioxy) - 11β - hydroxy-5α - pregnano - [3,2-c]pyrazole which has a 9α-halo-substituent is preferably prepared by the following alternate route.

Using the procedures described above, the 9α-halo-11β,17α,21-trihydroxy - 5α - pregnane 3,20-dione is converted into the corresponding 17α,20,20,21-bis(methylenedioxy)-9α-halo-11β-hydroxy-5α-pregnane-3-one. The latter compound is then oxidized to the 17α,20,20,21-bis-(methylenedioxy)-9α-halo-5α-pregnane-3,11-dione, which is reacted with ethyl formate and sodium hydride to form the 2 - hydroxymethylene - derivative. The 2 - hydroxymethylene compound is reacted with hydrazine, or a monosubstituted hydrazine, to give the corresponding 17α, 20,20,21 - bis(methylenedioxy) - 9α - halo - 11 - oxo - 5α-pregnano-[3,2-c]pyrazole compound, or the N-substituted derivative thereof. The latter compound is then reduced to the corresponding 17α,20,20,21-bis (methylenedioxy)-9α-halo-11β-hydroxy-5α-pregnano - [3,2-c]pyrazole compound, for example, by adding a saturated solution of sodium borohydride to a solution of the steroid in a mixture of triethylamine and isopropyl alcohol to which we prefer to add a little water, and allowing the mixture to stand over night.

Upon treatment of any of the above described 17α,20, 20,21-bis(methylenedioxy)-5α-pregnano-[3,2-c] pyrazole compounds with a dilute organic acid, for example, a 60% aqueous solution of formic acid, the 17α,20,20,21-bis(methylenedioxy) - protecting group is removed and there is obtained the corresponding 17α,21-dihydroxy-20-oxo-5α-pregnano-[3,2-c]pyrazoles which are represented by structures A and B:

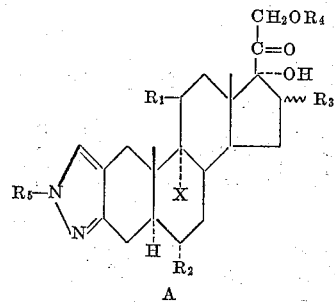

A

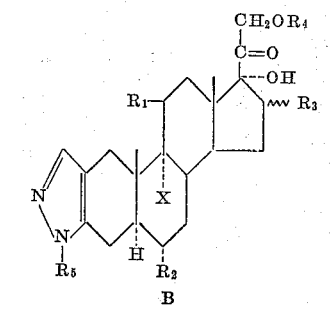

B wherein $R_1$ is hydrogen, β-halogen, β-hydroxy or keto, but β-halogen is present at $R_1$ only when X is halogen; $R_2$, $R_3$ and X have the meaning described above, and $R_5$ is acyl, alkyl, cycloalkyl, aralkyl, aryl, a heterocyclic nucleus or substituted derivative thereof, and $R_4$ is hydrogen, an acyl group corresponding to the organic acid used in this reaction, or a mixture of the two.

Any acyl groups present at $R_4$ and/or at $R_5$ may be removed by treating the steroid with sodium methoxide in methanol at room temperature to form the corresponding 17α,21 - dihydroxy-20-oxo-5α-pregnano-[3,2-c]-pyrazole. Acyl groups present at the $R_5$ position may be selectively removed by treatment with aqueous acetic acid.

The compounds of our invention include, among others, the following:

11β,17α,21-trihydroxy-20-oxo-5α-pregnano-[3,2-c]-pyrazole,
11β,17α,21-trihydroxy-16α-methyl-20-oxo-5α-pregnano-[3,2-c]pyrazole,
11β,17α,21-trihydroxy-16β-methyl-20-oxo-5α-pregnano-[3,2-c]pyrazole,
16α-fluoro-11β,17α,21-trihydroxy-20-oxo-5α-pregnano-[3,2-c]pyrazole,
11β,17α,21-trihydroxy-6α-methyl-20-oxo-5α-pregnano-[3,2-c]pyrazole,
11β,17α,21-trihydroxy-6α,16α-dimethyl-20-oxo-5α-pregnano-[3,2-c]pyrazole,
11β,17α,21-trihydroxy-6α,16β-dimethyl-20-oxo-5α-pregneno-[3,2-c]pyrazole,
16α-fluoro-11β,17α,21-trihydroxy-6α-methyl-20-oxo-5α-pregneno-[3,2-c]pyrazole,
6α-fluoro-11β,17α,21-trihydroxy-20-oxo-5α-pregneno-[3,2-c]pyrazole,
6α-fluoro-11β,17α,21-trihydroxy-16α-methyl-20-oxo-5α-pregnano-[3,2-c]pyrazole,
6α-fluoro-11β,17α,21-trihydroxy-16β-methyl-20-oxo-5α-pregnano-[3,2-c]pyrazole,
6α,16α-difluoro-11β,17α,21-trihydroxy-20-oxo-5α-pregnano-[3,2-c]pyrazole,
9α-fluoro-11β,17α,21-trihydroxy-20-oxo-5α-pregnano-[3,2-c]pyrazole,
9α-fluoro-11β,17α,21-trihydroxy-16α-methyl-20-oxo-5α-pregnano-[3,2-c]pyrazole,
9α-fluoro-11β,17α,21-trihydroxy-16β-methyl-20-oxo-5α-pregnano-[3,2-c]pyrazole,
9α,16α-difluoro-11β,17α,21-trihydroxy-20-oxo-5α-pregnano-[3,2-c]pyrazole,
9α-chloro-11β,17α,21-trihydroxy-20-oxo-5α-pregnano-[3,2-c]pyrazole,
9α-chloro-11β,17α,21-trihydroxy-16α-methyl-20-oxo-5α-pregnano-[3,2-c]pyrazole,
9α-chloro-11β,17α,21-trihydroxy-16β-methyl-20-oxo-5α-pregnano-[3,2-c]pyrazole,
9α-chloro-16α-fluoro-11β,17α,21-trihydroxy-20-oxo-5α-pregnano-[3,2-c]pyrazole,
9α-fluoro-11β,17α,21-trihydroxy-6α-methyl-20-oxo-5α-pregnano-[3,2-c]pyrazole,
9α-fluoro-11β,17α,21-trihydroxy-6α,16α-dimethyl-20-oxo-5α-pregnano-[3,2-c]pyrazole,
9α-fluoro-11β,17α,21-trihydroxy-6α,16β-dimethyl-20-oxo-5α-pregnano-[3,2-c]pyrazole,
9α,16α-difluoro-11β,17α,21-trihydroxy-6α-methyl-20-oxo-5α-pregnano-[3,2-c]pyrazole,
9α-chloro-11β,17α,21-trihydroxy-6α-methyl-20-oxo-5α-pregnano-[3,2-c]pyrazole,
9α-chloro-11β,17α,21-trihydroxy-6α,16α-dimethyl-20-oxo-5α-pregnano-[3,2-c]pyrazole,
9α-chloro-11β,17α,21-trihydroxy-6α,16β-dimethyl-20-oxo-5α-pregnano-[3,2-c]pyrazole,
9α-chloro-16α-fluoro-11β,17α,21-trihydroxy-6α-methyl-20-oxo-5α-pregnano-[3,2-c]pyrazole,
9α-chloro-6α-fluoro-11β,17α,21-trihydroxy-20-oxo-5α-pregnano-[3,2-c]pyrazole,
9α-chloro-6α-fluoro-11β,17α,21-trihydroxy-16α-methyl-20-oxo-5α-pregnano-[3,2-c]pyrazole,
9α-chloro-6α-fluoro-11β,17α,21-trihydroxy-16β-methyl-20-oxo-5α-pregnano-[3,2-c]pyrazole,
9α-chloro-6α,16α-difluoro-11β,17α,21-trihydroxy-20-oxo-5α-pregnano-[3,2-c]pyrazole,
6α,9α-difluoro-11β,17α,21-trihydroxy-20-oxo-5α-pregnano-[3,2-c]pyrazole,
6α,9α-difluoro-11β,17α,21-trihydroxy-16α-methyl-20-oxo-5α-pregnano-[3,2-c]pyrazole,
6α,9α-difluoro-11β,17α,21-trihydroxy-16β-methyl-20-oxo-5α-pregnano-[3,2-c]pyrazole,
6α,9α,16α-trifluoro-11β,17α,21-trihydroxy-20-oxo-5α-pregnano-[3,2-c]pyrazole and the 11-oxo-analogues of all of the above compounds, the 9α,11β-dichloro-17α,21-dihydroxy-20-oxo-5α-pregnano-[3,2-c]pyrazole,
9α,11β-dichloro-17α,21-dihydroxy-16α-methyl-20-oxo-5α-pregnano-[3,2-c]pyrazole,
9α,11β-dichloro-17α,21-dihydroxy-16β-methyl-20-oxo-5α-pregnano-[3,2-c]pyrazole,
9α,11β-dichloro-16α-fluoro-17α,21-dihydroxy-20-oxo-5α-pregnano-[3,2-c]pyrazole,
9α,11β-dichloro-6α-fluoro-17α,21-dihydroxy-20-oxo-5α-pregnano-[3,2-c]pyrazole,
9α,11β-dichloro-6α-fluoro-17α,21-dihydroxy-16α-methyl-20-oxo-5α-pregnano-[3,2-c]pyrazole,
9α,11β-dichloro-6α-fluoro-17α,21-dihydroxy-16β-methyl-20-oxo-5α-pregnano-[3,2-c]pyrazole,
9α,11β-dichloro-6α,16α-difluoro-17α,21-dihydroxy-20-oxo-5α-pregnano-[3,2-c]pyrazole,
9α,11β-dichloro-17α,21-dihydroxy-6α-methyl-20-oxo-5α-pregnano-[3,2-c]pyrazole,
9α,11β-dichloro-17α,21-dihydroxy-6α,16α-dimethyl-20-oxo-5α-pregnano-[3,2-c]pyrazole,
9α,11β-dichloro-17α,21-dihydroxy-6α,16β-dimethyl-20-oxo-5α-pregnano-[3,2-c]pyrazole,
9α,11β-dichloro-16α-fluoro-17α,21-dihydroxy-6α-methyl-20-oxo-5α-pregnano-[3,2-c]pyrazole, as well as the 1'- and 2'-alkyl-, the 1'- and 2'-cycloalkyl-, the 1'- and 2'-aryl-, and the 1'- and 2'-aralkyl-derivatives of all of the above named compounds; also the 11-desoxy-analogs of all of the aforesaid compounds.

The 21-acyl derivatives of the above described 17α,21-dihydroxy-20-oxo-5α-pregnano-[3,2-c]pyrazoles in which $R_5$ is H may be prepared by heating an N-acyl-17α,21-dihydroxy-20-oxo-5α-pregnano-[3,2-c]pyrazole 21 - acylate with aqueous acetic acid, whereupon the N-acyl group is selectively removed.

The N-acyl-21-acylate derivatives of the above described 17α,21 - dihydroxy-20-oxo-5α-pregnano-[3,2-c]-pyrazoles in which both acyl groups are the same may be prepared by reacting a 17α,21-dihydroxy-20-oxo-5α-pregnano-[3,2-c]pyrazole with two equivalents of an acylating agent.

The N-acyl-21-acelate derivatives of the above described 17α,21 - dihydroxy-20-oxo-5α-pregnano-[3,2-c]-pyrazoles in which the acyl groups are different are prepared by reaction of a 17α,21-dihydroxy-20-oxo-5α-pregnano-[3,2-c]pyrazole 21-acylate with an acylating agent in which the acyl group of the acylating agent is different from the acyl group already present at the 21-position of the pyrazole.

Acylating agents which can be used for this purpose include a lower hydrocarbon carboxylic acid acylating agent such as benzoic anhydride, tertiary butyl acetyl chloride; a lower alkanoic anhydride or lower alkanoyl halide such as acetic anhydride, propionic anhydride or acetyl chloride; or a polybasic anhydride such as β,β-dimethylglutaric anhydride, succinic anhydride and the like, in the presence of an organic base such as pyridine.

The 17α,21 - dihydroxy-20-oxo-5α-pregnano-[3,2-c]pyrazole is reacted with methane sulfonyl chloride in a nonaqueous base to form the 21-mesylate. A steroid in which $R_5$ is hydrogen is first converted to the N-carbamyl derivative before undergoing this reaction.

The 17α,21-dihydroxy-20-oxo-5α-pregnano-[3,2-c]pyrazole 21-mesylate is heated with an alkali iodide to form the 21-iodo-compound. In a preferred method for carrying out this reaction, sodium iodide is added to the steroid dissolved in acetone and the resulting mixture is heated at reflux temperature for approximately one hour.

The 17α-hydroxy-21-iodo-20-oxo-5α-pregnano-[3,2-c]-pyrazole is heated with an alkali bisulfite in a solvent to form the corresponding 21-desoxy-compound which has structures A and B:

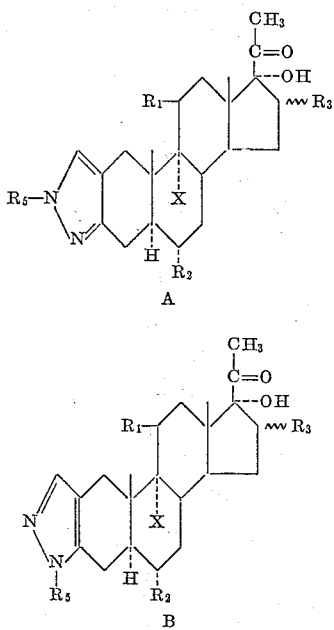

wherein $R_5$ is carbamyl, alkyl, cycloalkyl, aralkyl, aryl, a heterocyclic nucleus, or substituted derivatives thereof, and wherein $R_1$, $R_2$, $R_3$, and $X$ have the significance above defined. A preferred method is to add sodium bisulfite to a suspension of the steroid in aqueous ethanol and then heat the mixture under reflux for a period of about an hour. Any carbamyl group present at $R_5$ may be removed by treating the steroid in glacial acetic acid with sodium nitrite.

Thus the novel compounds of our invention which are formed from the above reactions include:

11β,17α-dihydroxy-16α-methyl-20-oxo-5α-pregnano-[3,2-c]pyrazole,
11β,17α-dihydroxy-16β-methyl-20-oxo-5α-pregnano-[3,2-c]pyrazole,
16α-fluoro-11β,17α-dihydroxy-20-oxo-5α-pregnano-[3,2-c]pyrazole,
11β,17α-dihydroxy-6α-methyl-20-oxo-5α-pregnano-[3,2-c]pyrazole,
11β,17α-dihydroxy-6α,16α-dimethyl-20-oxo-5α-pregnano-[3,2-c]pyrazole,
11β,17α-dihydroxy-6α,16β-dimethyl-20-oxo-5α-pregnano-[3,2-c]pyrazole,
16α-fluoro-11β,17α-dihydroxy-6α-methyl-20-oxo-5α-pregnano-[3,2-c]pyrazole,
6α-fluoro-11β,17α-dihydroxy-20-oxo-5α-pregnano-[3,2-c]pyrazole,
6α-fluoro-11β,17α-dihydroxy-16α-methyl-20-oxo-5α-pregnano-[3,2-c]pyrazole,
6α-fluoro-11β,17α-dihydroxy-16β-methyl-20-oxo-5α-pregnano-[3,2-c]pyrazole,
6α,16α-difluoro-11β,17α-dihydroxy-20-oxo-5α-pregnano-[3,2-c]pyrazole,
9α-fluoro-11β,17α-dihydroxy-20-oxo-5α-pregnano-[3,2-c]pyrazole,
9α-fluoro-11β,17α-dihydroxy-16α-methyl-20-oxo-5α-pregnano-[3,2-c]pyrazole,
9α-fluoro-11β,17α-dihydroxy-16β-methyl-20-oxo-5α-pregnano-[3,2-c]pyrazole,
9α,16α-difluoro-11β,17α-dihydroxy-20-oxo-5α-pregnano-[3,2-c]pyrazole,
9α-chloro-11β,17α-dihydroxy-20-oxo-5α-pregnano-[3,2-c]pyrazole,
9α-chloro-11β,17α-dihydroxy-16α-methyl-20-oxo-5α-pregnano-[3,2-c]pyrazole,
9α-chloro-11β,17α-dihydroxy-16β-methyl-20-oxo-5α-pregnano-[3,2-c]pyrazole,
9α-chloro-16α-fluoro-11β,17α-dihydroxy-20-oxo-5α-pregnano-[3,2-c]pyrazole,
9α-fluoro-11β,17α-dihydroxy-6α-methyl-20-oxo-5α-pregnano-[3,2-c]pyrazole,
9α-fluoro-11β,17α-dihydroxy-6α,16α-dimethyl-20-oxo-5α-pregnano-[3,2-c]pyrazole,
9α-fluoro-11β,17α-dihydroxy-6α,16β-dimethyl-20-oxo-5α-pregnano-[3,2-c]pyrazole,
9α,16α-difluoro-11β,17α-dihydroxy-6α-methyl-20-oxo-5α-pregnano-[3,2-c]pyrazole,
9α-chloro-11β,17α-dihydroxy-6α-methyl-20-oxo-5α-pregnano-[3,2-c]pyrazole,
9α-chloro-11β,17α-dihydroxy-6α,16α-dimethyl-20-oxo-5α-pregnano-[3,2-c]pyrazole,
9α-chloro-11β,17α-dihydroxy-6α,16β-dimethyl-20-oxo-5α-pregnano-[3,2-c]pyrazole,
9α-chloro-16α-fluoro-11β,17α-dihydroxy-6α-methyl-20-oxo-5α-pregnano-[3,2-c]pyrazole,
9α-chloro-6α-fluoro-11β,17α-dihydroxy-20-oxo-5α-pregnano-[3,2-c]pyrazole,
9α-chloro-6α-fluoro-11β,17α-dihydroxy-16α-methyl-20-oxo-5α-pregnano-[3,2-c]pyrazole,
9α-chloro-6α-fluoro-11β,17α-dihydroxy-16β-methyl-20-oxo-5α-pregnano-[3,2-c]pyrazole,
9α-chloro-6α,16α-difluoro-11β,17α-dihydroxy-20-oxo-5α-pregnano-[3,2-c]pyrazole,
6α,9α-difluoro-11β,17α-dihydroxy-20-oxo-5α-pregnano-[3,2-c]pyrazole,
6α,9α-difluoro-11β,17α-dihydroxy-16α-methyl-20-oxo-5α-pregnano-[3,2-c]pyrazole,
6α,9α-difluoro-11β,17α-dihydroxy-16β-methyl-20-oxo-5α-pregnano-[3,2-c]pyrazole,
6α,9α,16α-trifluoro-11β,17α-dihydroxy-20-oxo-5α-pregnano-[3,2-c]pyrazole,
and the 11-oxo-analogues of all of the above compounds, the
9α,11β-dichloro-17α-hydroxy-20-oxo-5α-pregnano-[3,2-c]pyrazole,
9α,11β-dichloro-17α-hydroxy-16α-methyl-20-oxo-5α-pregnano-[3,2-c]pyrazole,
9α,11β-dichloro-17α-hydroxy-16β-methyl-20-oxo-5α-pregnano-[3,2-c]pyrazole,
9α,11β-dichloro-16α-fluoro-17α-hydroxy-20-oxo-5α-pregnano-[3,2-c]pyrazole,
9α,11β-dichloro-6α-fluoro-17α-hydroxy-20-oxo-5α-pregnano-[3,2-c]pyrazole,
9α,11β-dichloro-6α-fluoro-17α-hydroxy-16α-methyl-20-oxo-5α-pregnano-[3,2-c]pyrazole,
9α,11β-dichloro-6α-fluoro-17α-hydroxy-16β-methyl-20-oxo-5α-pregnano-[3,2-c]pyrazole,
9α,11β-dichloro-6α,16α-difluoro-17α-hydroxy-20-oxo-5α-pregnano-[3,2-c]pyrazole,
9α,11β-dichloro-17α-hydroxy-6α-methyl-20-oxo-5α-pregnano-[3,2-c]pyrazole,
9α,11β-dichloro-17α-hydroxy-6α,16α-dimethyl-20-oxo-5α-pregnano-[3,2-c]pyrazole,
9α,11β-dichloro-17α-hydroxy-6α,16β-dimethyl-20-oxo-5α-pregnano-[3,2-c]pyrazole,
9α,11β-dichloro-16α-fluoro-17α-hydroxy-6α-methyl-20-oxo-5α-pregnano-[3,2-c]pyrazole, as well as the 1'- and 2'-alkyl-, and the 1'- and 2'-cycloalkyl-, and the 1'- and 2'-aryl-, including particularly the phenyl and the 2-p-fluorophenyl), the 1'- and 2'-aralkyl- and the N-acyl-derivatives of all of the above named compounds; also the 11-desoxy-analogs of all of the foregoing compounds.

The 21-dihydrogen phosphate esters are prepared by the reaction of the corresponding 21-iodo compound with a mixture of silver phosphate and phosphoric acid. Both the mono- and dialkali metal salts may be obtained by neutralization of the dihydrogen phosphate ester with an alkali methoxide. Treatment with additional amounts of alkali methoxide will convert an N-acyl-steroid ($R_5$=acyl) into the free amine ($R_5$=H) dialkali metal salt from which the dihydrogen phosphate can be obtained by contacting with an ion exchange resin.

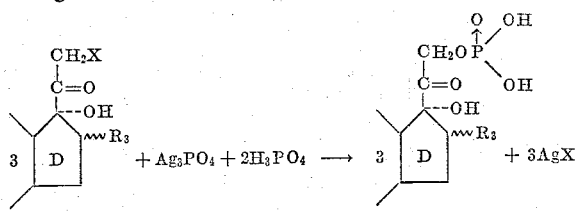

The A, B, C and pyrazole rings are not shown in the above equation, as the substituent groups on these rings do not affect the course of reaction and in general are unchanged during reaction. $R_3$ has the meaning above defined and X is halogen.

The 21-fluoro-17α-hydroxy-20-oxo-5α-pregnano-[3,2-c]-pyrazoles are prepared from the corresponding 17α,21-dihydroxy - 20 - oxo - 5α - pregnano - [3,2 - c]pyrazole 21-mesylate by heating with an alkali fluoride in a solvent to form a mixture of a 17α,21-epoxy-compound and the corresponding 21-fluoro compound. These compounds are separated by partition chromatography, or by chromatography on a weak adsorbent such as silica gel. There is thus obtained the 21-fluoro-derivatives of all of the compounds named in columns 9 and 10.

The 21-fluoro-derivatives are represented by structures A and B:

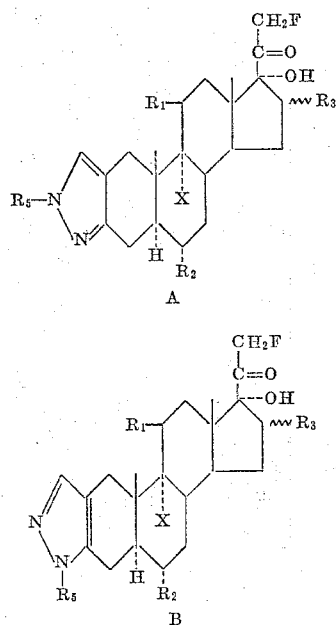

wherein $R_1$, $R_2$, $R_3$, $R_5$ and X have the significance above described. All of the 5α-pregnano-[3,2-c]pyrazoles described in the foregoing structures form salts such as the hydrochloride, sulfate, chlorate, perchlorate, picrate and trichloracetate, on treatment with the corresponding acid. Formation of crystalline salts, especially the hydrochloride salts, provides a means of isolating the 5α-pregnano-[3,2-c]pyrazoles.

A further embodiment of our invention comprises novel pharmaceutical compositions containing the novel 5α-pregnano-[3,2-c]pyrazoles exemplified in the foregoing structures.

The following examples illustrate methods of carrying out the present invention but it is to be understood that these examples are given for purposes of illustration and not of limitation. Details of the above described reactions are to be found in the examples.

*Example 1*

To a suspension of 25.0 g. of 11β,17α,21-trihydroxy-4-pregnene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paper-strip chromatography. A 2.425 g. aliquot is recrystallized three times from a mixture of benzene and n-hexane to give 17α,20,20,21-bis(methylenedioxy) - 11β - hydroxy-4-pregnene-3-one.

Lithium wire (0.9 g.) is dissolved in approximately 100 ml. of ammonia. A slurry of 19.8 grams of 17α,20,20,21-bis(methylenedioxy)-11β - hydroxy - 4 - pregnene-3-one in tetrahydrofuran is added. The mixture is allowed to stir under a Dry Ice condenser for 2½ hours, after which the methanol is added and the ammonia is allowed to evaporate. The product is distributed between chloroform and water and the chloroform extracts are washed with water, dried over anhydrous magnesium sulfate and concentrated under vacuum to a crystalline residue (20.4 grams), chromatographed over alkaline alumina and elution with a mixture of 30% chloroform in ether affords 9.7 g. of 17α,20,20,21-bis(methylenedioxy)-11β-hydroxy-5α-pregnane-3-one, M.P. 215–219° C.

The above 17α,20,20,21-bis(methylenedioxy)-11β-hydroxy-5α-pregnane-3-one can also be prepared by the following route: 11β,17α,21-trihydroxy-4-pregnene-3,20-dione (50 g.), M.P. 214–217° C. is dissolved in 350 ml. of methanol and 2-5 liters of benzene on a steam bath. The steroid is reduced with 45.0 g. of 5% Pd/BaSO₄ at room temperature and 30 pounds pressure for about 21 hours. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. It is then allowed to stand over night at 5° C. There is obtained about 12.6 grams of 11β,17α,21-trihydroxy - 5α - pregnane-3,20-dione crystals, M.P. 235–237° C. The 11β,17α,21-trihydroxy-5α-pregnane-3-one (12.0 g.) is suspended in 735 ml. of methylene chloride, and then poured into a cold mixture of 240 ml. of concentrated HCl and 240 ml. of formaldehyde (low in methanol) while maintaining the temperature at 5° C. After standing over night the layers are separated and the aqueous layer is extracted with 40 ml. of methylene chloride. The organic layer is washed with water and then 3 times with 50 ml. of sodium bicarbonate solution. The organic layer is then dried over magnesium sulfate, filtered and concentrated under vacuum to dryness. The residue is dissolved in 5:3 ether mixture of ether and chloroform and chromatographed on 246 g. of acid washed alumina. An additional quantity of product is collected from the eluant giving a total yield of 17α,20,20,21-bis-(methylenedioxy)-11β-hydroxy-5α-pregnane-3-one, M.P. 180–198° C. The product is crystallized from ethyl acetate.

A mixture of 1.2 g. of sodium hydride as a 53% dispersion in mineral oil, 40 ml. of absolute benzene, and 1.2 ml. of absolute t-butanol are stirred together under nitrogen at room temperature for 20 minutes. This mixture is then added to a solution of 3.800 g. of 17α,20,20,21 - bis(methylenedioxy) - 11β - hydroxy-5α-pregnane-3-one in a mixture of 150 ml. of absolute benzene and 7 ml. of freshly distilled ethyl formate. Reaction mixture is stirred under nitrogen at room temperature over night and then poured into water. The basic aqueous solution is extracted once with a mixture of benzene and ether (1:1), and once with ether. The organic layers are washed once with 2 N potassium hydroxide solution. The combined base extracts are ice cooled and acidified with 18% hydrochloric acid. The product is back extracted with ethyl acetate to give 3.75 g. of semi-crystalline material. One crystallization from ether yields 3.04 g. of crystalline 17α,20,20,21-bis(methylenedioxy)-11β-hydroxy-2-hydroxymethylene-5α-pregnane-3 - one, M.P. 251–253° C.

The 17α,20,20,21 - bis(methylenedioxy)-11β-hydroxy-2-hydroxymethylene-5α-pregnane-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21-bis(methylenedioxy)-11β-hydroxy-5α-pregnano-[3,2-c]pyrazole.

The 17α,20,20,21 - bis(methylenedioxy)-11β-hydroxy-5α-pregnano-[3,2-c]pyrazole (720 mg.) is heated in a steam bath with 24 ml. of a 60% aqueous solution of formic acid for about 30 minutes. The excess reagent is removed under vacuum using a water bath at about 50° C. as the source of heat. The residue is flushed four times with n-hexane and then dried at 60° C. in high vacuum to give an amorphous solid which is a mixture of 11β,17α,21 - trihydroxy-20-oxo-5α-pregnano - [3,2-c]pyrazole and 21-formyloxy - 11β,17α - dihydroxy-20-oxo-5α-pregnano-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to drynes and flushed with n-hexane. The residue is washed with water, filtered and dried to constant weight to give 11β,17α,21-trihydroxy-20-oxo-5α-pregnano-[3,2-c]pyrazole.

To a solution of 100 mg. of 11β,17α,21-trihydroxy-20-oxo-5α-pregnano-[3,2-c]pyrazole in 2 ml. of pyridine is added two milliequivalents of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N - acetyl-11β,17α,21-trihydroxy-20-oxo-5α-pregnano-[3,2-c]pyrazole 21-acetate is then isolated by addition of water and filtration.

In accordance with the above procedure, but starting with the 11β,17α,21-trihydroxy - 20 - oxo - 5α - pregnano-[3,2-c]pyrazole and using two milliequivalents of another acylating agent there is obtained the corresponding N-acyl - 11β,17α,21 - trihydroxy - 20 - oxo - 5α - pregnano - [3,2-c]pyrazole 21-acylate.

A solution of 5.73 g. of N-acetyl-11β,17α,21-trihydroxy-20-oxo-5α-pregnano-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 11β,17α,21-trihydroxy-20-oxo - 5α - pregnano - [3,2-c]pyrazole 21-acetate.

To a solution of 3.70 g. of 11β,17α,21-trihydroxy-20-oxo-5α-pregnano-[3,2-c]pyrazole 21-acetate in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed under vacuum on the rotating evaporator; more water is added and the precipitate is collected by filtration. Recrystallization from methanol gives the N-carbamyl pyrazole in sufficient purity for the next step.

A 500 mg. aliquot of the N-carbamyl-11β,17α,21-trihydroxy-20-oxo-5α-pregnano-[3,2-c]pyrazole 21-acetate is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl-11β,17α,21-trihydroxy-20-oxo - 5α - pregnano - [3,2-c]pyrazole.

To a solution of 85 mg. of N-carbamyl-11β,17α,21-trihydroxy-20-oxo-5α-pregnano-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-carbamyl-11β,17α,21 - trihydroxy - 20 - oxo-5α-pregnano-[3,2-c]pyrazole 21-mesylate.

To 180 mg. of N-carbamyl-11β,17α,21-trihydroxy-20-oxo-5α-pregnano-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl-11β,17α-dihydroxy-21-iodo-20-oxo-5α-pregnano-[3,2-c]pyrazole.

The N-carbamyl-11β,17α-dihydroxy-21 - iodo - 20-oxo-5α-pregnano-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N-carbamyl-11β,17α-dihydroxy-20-oxo-5α-pregnano-[3,2-c]pyrazole.

To a solution of 62 mg. of N-carbamyl-11β,17α,21-trihydroxy-20-oxo-5α-pregnano - [3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl-17α,21-epoxy-11β-hydroxy-20-oxo-5α - pregnano - [3,2-c] pyrazole and N-carbamyl-21-fluoro-11β,17α-dihydroxy-20-oxo-5α-pregnano-[3,2-c]pyrazole, which compounds are separated by partition chromatography or by chromatography on silica gel.

To a solution of 355 mg. of N-carbamyl-11β,17α-dihydroxy-20-oxo-5α-pregnano-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 11β,17α-dihydroxy-20-oxo-5α-pregnano-[3,2-c]pyrazole.

In accordance with the above procedure, but starting with the N-carbamyl-21-fluoro-11β,17α-dihydroxy-20-oxo-5α-pregnano-[3,2-c]pyrazole there is obtained the 21-fluoro-11β,17α-dihydroxy-20-oxo-5α-pregnano-[3,2-c]pyrazole.

In accordance with the above procedures, but starting with the 11β,17α,21-trihydroxy-16α-methyl-4-pregnene-3,20-dione in place of the 11β,17α,21-trihydroxy-4-pregnene-3,20-dione, there are obtained as products the corresponding 11β,17α,21-trihydroxy-16α-methyl-20-oxo-5α-pregnano-[3,2-c]pyrazole and the 21-acylate, and the N-acyl-21-acylate derivatives thereof in which the two acyl groups may be the same or different; the 11β,17α-dihydroxy-16α-methyl-20-oxo-5α-pregnano-[3,2-c]pyrazole; and the 21-fluoro-11β,17α-dihydroxy-16α-methyl-20-oxo-5α-pregnano-[3,2-c]pyrazole.

*Example 2*

9α-fluoro-11β,17α,21-trihydroxy-16α-methyl-4-pregnene-3,20-dione (50 g.), is dissolved in 350 ml. of methanol and 2-5 liters of benzene on a steam bath. The steroid is hydrogenated using as catalyst 45.0 g. of 5% Pd/BaSO$_4$ at room temperature and 30 pounds pressure for about 21 hours. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. After standing over night at 5° C. there is obtained the 9α-fluoro-11β,17α,21-trihydroxy-16α-methyl-5α-pregnane-3,20-dione.

A 5 g. sample of 9α-fluoro-11β,17α,21-trihydroxy-16α-methyl-5α-pregnane-3,20-dione is dissolved in a mixture of 235 ml. of chloroform and 150 ml. of methylene chloride, cooled in an ice bath with stirring and treated with 85 ml. of formaldehyde (37%). An equal volume (85 ml.) of cold concentrated hydrochloric acid is added from a funnel over a 5-minute interval with stirring and cooling. The mixture is stirred at room temperature for four hours. The layers are separated and the organic layer is washed free of acid by washing three times with water and then with a 5% solution of sodium bicarbonate. The organic layers are washed free of bicarbonate, dried over magnesium sulfate and taken to dryness. The gummy residue is treated with enough hot methanol on a steam bath to effect trituration, and the resulting crystalline solid is separated by filtering the mixture while hot. (The filtrate is set aside and may deposit additional product over night.) The crude product is dried to constant weight and purified by chromatography. The product is partially dissolved in 250 ml. of hot chloroform and diluted with an equal volume of hot benzene to complete solution. After cooling, the mixture is adsorbed in 100 g. of basic alumina and eluted with benzene and chloroform to give 17α,20,20,21-bis(methylenedioxy)-9α-fluoro-16α-methyl-11β-hydroxy-5α-pregnane-3-one.

The 17α,20,20,21-bis(methylenedioxy)-9α-fluoro-16α-methyl-11β-hydroxy-5α-pregnane-3-one (3.25 g.) is dissolved in 76 ml. of dry pyridine and added to a cold solution prepared by the cautious addition of 3.25 g. of chromium trioxide (in portions) to 34.7 ml. of cold pyridine. The mixture is allowed to stand at room temperature over night. The mixture is poured into water and extracted three times with ethyl acetate, avoiding excessive shaking especially during the third extraction. The combined ethyl acetate extracts are washed three times with 1 N sulfuric acid and then with water until neutral. The combined ethyl acetate extracts are dried over magnesium sulfate and taken to dryness to give 2.94 g. of product. The product is dissolved in benzene, adsorbed on basic alumina and eluted with 8:2 benzene:chloroform to give 17α,20,20,21-bis(methylenedioxy)-9α-fluoro-16α-methyl-5α-pregnane-3,11-dione.

A 2.60 g. sample of 17α,20,20,21-bis(methylenedioxy)-9α-fluoro-16α-methyl-5α-pregnane-3,11-dione is dissolved in 95 ml. of dry benzene using dry equipment and treated with 2.43 ml. of freshly distilled ethyl formate. About 1.19 g. of a dispersion of sodium hydride in mineral oil (about 51%) is added, followed by about 1.19 g. of freshly prepared dry sodium methoxide (dried at about 175° C. oil pump for 4 hours). The air in the system is again replaced with nitrogen and the mixture, which turns yellow at once, is stirred at room temperature for one and one-half hours. At this point the color of the reaction mixture is a dark orange. The mixture is chilled in an ice bath and a cold, saturated solution of sodium dihydrogen phosphate is added gradually to decompose excess sodium hydride and neutralize the sodium methoxide. Ether is added and the layers are separated. The aqueous layers are back-extracted with ether and the combined organic layers are washed free of acid with water and then extracted three to four times with a 5% aqueous solution of sodium bicarbonate. These extracts are set aside. The product is now extracted four to five times with a cold 2% aqueous solution of sodium hydroxide. (In order to avoid emulsification, the aqueous alkali is gently poured into the separatory funnel and the layers are separated without shaking the funnel. The last two extracts may be shaken with care.) The dark liquor is back-extracted two times with ether, and finally acidified in the cold with saturated aqueous solution of sodium dihydrogen phosphate. The neutral ether-benzene fraction should be set aside and processed as described below. The product is extracted into ether, and the ether extracts are washed free of acid with a saturated solution of sodium chloride. After drying over magnesium sulfate, the ether solution is taken to dryness and the amorphous product is crystallized from methanol to give 17α,20,20,21-bis(methylenedioxy)-9α-fluoro-2-hydroxymethylene-16α-methyl-5α-pregnane-3-11-dione. This material is satisfactory for use in the next step.

A 1.00 g. aliquot of 17α,20,20,21-bis(methylenedioxy)-9α-fluoro-2-hydroxymethylene-16α-methyl-5α-pregnane-3,11-dione is suspended in 44 ml. of absolute ethanol and treated with 0.38 ml. of hydrazine hydrate (99–100%). The air in the system is replaced with nitrogen and the mixture is quickly brought to the reflux temperature. After refluxing for one hour, the mixture is taken to dryness; the residual oil is treated with water and the resulting amorphous solid is removed by filtration, washed thoroughly with water and dried. The yield is about 900 mg. The crude product is dissolved in absolute ethanol and concentrated under vacuum until the solid separates. The solid is redissolved by heating, and then allowed to crystallize slowly to afford 17α,20,20,21-bis(methylenedioxy)-9α-fluoro-16α-methyl-11-oxo-5α-pregnano-[3,2-c]pyrazole.

A 455 mg. aliquot of 17α,20,20,21-bis(methylenedioxy)-9α-fluoro-16α-methyl-11-oxo-5α-pregnano-[3,2-c]pyrazole is suspended in 75 ml. of a solution of sodium borohydride in isopropanol which is prepared by suspending an excess of sodium borohydride in isopropanol, stirring vigorously for about 15 minutes, and filtering to separate the excess of sodium borohydride. To the suspension is added a 0.816 ml. aliquot of a solution of 0.55 ml. of triethylamine in 1.45 ml. of isopropanol. The mixture is stirred, and enough methylene chloride (about 30 ml.) is added, with cooling to make the system homogeneous. One drop of water (ca. ½₀ ml.) is added and the mixture is stirred in a nitrogen atmosphere at room temperature overnight. Insolubles generally separate out in the course of the reaction.

The mixture is then cooled, and the excess of sodium borohydride is decomposed by the addition of cold 2.5 N hydrochloric acid. The mixture (pH ca. 5) is taken to dryness under vacuum and the residue is washed with water and dried to give 17α,20,20,21-bis(methylenedioxy) - 9α - fluoro - 11β - hydroxy - 16α - methyl - 5α-pregnano-[3,2-c]pyrazole.

The 17α,20,20,21-bis(methylenedioxy)-9α-fluoro-11β-hydroxy - 16α - methyl-5α-pregnano-[3,2-c]pyrazole (25 mg.) is heated on a steam bath with 5 cc. of a 60% aqueous solution of formic acid for about 30 minutes. The excess reagent is removed under reduced pressure using a water bath at about 50° C. as the source of heat. The residue is flushed with n-hexane. The residue is then dissolved in acetone and precipitated with n-hexane to give an amorphous solid which is a mixture of 9α-fluoro-11β,17α,21-trihydroxy - 16α - methyl - 20 - oxo-5α-pregnano-[3,2-c]pyrazole and 9α-fluoro - 21 - formyloxy-11β, 17α - dihydroxy - 16α - methyl - 20 - oxo - 5α - pregnano-[3,2-c]pyrazole, which compounds are separated by chromatography. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α-fluoro-11β,17α,21-trihydroxy-16α-methyl-20-oxo-5α-pregnano-[3,2-c]pyrazole.

To a solution of 100 mg. of 9α-fluoro-11β,17α,21-trihydroxy-16α-methyl - 20 - oxo - 5α - pregnano - [3,2-c]-pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N-acetyl-9α-fluoro - 11β,17α,21 - trihydroxy-16α-methyl-20-oxo-5α-pregnano-[3,2-c]pyrazole 21-acetate is then isolated by addition of water and filtration.

In accordance with the above procedure, but starting with the 9α-fluoro-11β,17α,21-trihydroxy-16α-methyl-20-oxo - 5α - pregnano-[3,2-c]pyrazole and using two milliequivalents of another acylating agent, there is obtained the corresponding N-acyl-21-acylate thereof.

A solution of 5.73 g. of N-acyl-9α-fluoro-11β,17α,21-trihydroxy-16α-methyl - 20 - oxo - 5α - pregnano-[3,2-c]-pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 9α - fluoro - 11β,17α,21 - trihydroxy - 16α - methyl-20-oxo-5α-pregnano-[3,2-c]pyrazole 21-acetate.

To a solution of 3.70 g. of 9α-fluoro-11β,17α,21-trihydroxy - 16α - methyl-20-oxo-5α-pregnano-[3,2-c]pyrazole 21-acetate in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl pyrazole in sufficient purity for the next step.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give N-carbamyl-9α-fluoro-11β,17α,21 - trihydroxy - 16α - methyl - 20 - oxo-5α-pregnano-[3,2-c]pyrazole.

To a solution of 85 mg. of N-carbamyl-9α-fluoro-11β, 17α,21 - trihydroxy - 16α - methyl-20-oxo-5α-pregnano-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration washed with water, and dried to give N-carbamyl-9α-fluoro-11β,17α,21-trihydroxy - 16α - methyl - 20 - oxo - 5α - pregnane-20-one 21-mesylate.

To 180 mg. of N-carbamyl-9α-fluoro-11β,17α,21-trihydroxy-16α-methyl-20-oxo-5α-pregnano-[3,2-c]pyrazole 21-mesylate dissolved in 10 ml. of acetone is added 300 mg. of sodium iodide. The resulting mixture is heated at reflux temperature for a period of approximately one hour, and the reaction solution is cooled to room temperature and diluted with water. The material which precipitates is recovered by filtration, washed with water, and dried to give N - carbamyl - 9α-fluoro-11β,17α-dihydroxy-21-iodo-16α-methyl-20-oxo-5α-pregnano-[3,2-c]pyrazole.

The N - carbamyl - 9α - fluoro-11β,17α-dihydroxy-21-iodo - 16α - methyl-20-oxo-5α-pregnano-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N - carbamyl-9α-fluoro-11β,17α-dihydroxy-16α-methyl-20-oxo-5α-pregnano-[3,2-c]pyrazole.

To a solution of 62 mg. of N-carbamyl-9α-fluoro-11β, 17α,21 - trihydroxy - 16α-methyl-20-oxo-5α-pregnano-[3,-2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl - 17α,21 - epoxy-9α-fluoro-11β-hydroxy-16α-methyl-20-oxo-5α-pregnano-[3,2-c]pyrazole and N-carbamyl-9α,21 - difluoro - 11β,17α - dihydroxy-16α-methyl-20-oxo-5α-pregnano-[3,2-c]pyrazole, which compounds are separated by partition chromatography, or by chromatography on silica gel.

To a solution of 355 mg. of N-carbamyl-9α-fluoro-11β, 17α - dihydroxy - 16α-methyl-20-oxo-5α-pregnano-[3,2-c]-pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 9α-fluoro-11β,17α-dihydroxy-16α-methyl-20-oxo-5α-pregnano-[3,2-c]pyrazole.

In accordance with the above procedure, but starting with the N-carbamyl-9α,21-difluoro-11β,17α-dihydroxy-16α-methyl-20-oxo-5α-pregnano-[3,2-c]pyrazole there is obtained the 9α,21-difluoro-11β,17α-dihydroxy-16α-methyl-20-oxo-5α-pregnano-[3,2-c]pyrazole.

In accordance with the above procedures, but starting with the 9α-fluoro-6α-methyl-, the 9α-fluoro-6α,16β-dimethyl-, or the 6α,9α,16α-trifluoro-11β,17α,21-trihydroxy-4-pregnene-3,20-dione in place of the 9α-fluoro-11β,17α,21-trihydroxy-16α-methyl-4-pregnene-3,20-dione, there are obtained as products the corresponding 9α-fluoro-6α-methyl-, the 9α-fluoro-6α,16β-dimethyl-, or the 6α,9α,16α-trifluoro - 11β,17α,21 - trihydroxy - 20-oxo-5-pregnano-[3,2-c]pyrazole 21-acylate, and the N-acyl-21-acylate derivatives thereof in which the two acyl groups may be the same or different; the 9α-fluoro-6α-methyl-, the 9α-fluoro-6α,16β-dimethyl-, or the 6α,9α,16α-trifluoro-11β,17α-dihydroxy-20-oxo-5-pregnano-[3,2-c]pyrazole and the 9α,21-difluoro-6α-methyl-, the 9α,21-difluoro-6α,16β-dimethyl-, or the 6α,9α,16α,21-tetrafluoro-11β,17α-dihydroxy-11,20-dioxo-5α-pregnano-[3,2-c]pyrazole.

The 6α,9α,16α - trifluoro-11β,17α,21-trihydroxy-4-pregnene-3,20-dione used as starting material in the above reaction can be prepared by the following procedure:

One gram of methyl 3,11-diketo-4,17(20)-pregnadiene-21-oate is dissolved in 10 ml. of absolute ethanol and 2 ml. of ethyl orthoformate. Fifty milligrams of 2,4-dinitrobenzenesulfonic acid is added and, after stirring at room temperature for forty-five minutes, the reaction mixture is neutralized with pyridine and taken to dryness finally under high vacuum. The crude residual 3-enol ethyl ether is of sufficient purity for the next step.

Two hundred and fifty milligrams of the 3-enol ethyl ether of methyl 3,11 - diketo - 4,17(20)-pregnadiene-21-oate is dissolved in 5 ml. of dry pyridine. This mixture is cooled to −20° C. and perchloryl fluoride is bubbled through slowly for three minutes. It is then poured into ice and water and extracted several times with ethyl acetate. The organic layer is washed first with dilute hydrochloric acid and then with 5% sodium bicarbonate, and then dried. The residue, after removal of solvent, is a mixture of the 6α and 6β-fluoro-isomers and is used in the next step without purification.

Two hundred milligrams of the crude methyl-6ξ-fluoro-3,11-diketo-4,17(20)-pregnadiene-21-oate are refluxed in a Dean-Stark water separator in 10 ml. of benzene with 0.5 ml. of pyrrolidine and 50 mg. of p-toluenesulfonic acid. After twenty-four hours, the cooled reaction mixture is extracted rapidly once with water, dried and taken to dryness. The residue is redissolved in 10 ml. of tetrahydrofuran, 200 mg. of lithium aluminum hydride are added and the mixture is refluxed for two hours. Water is cautiously added to the cooled reaction mixture, followed by ethyl acetate. The organic layer is separated and taken to dryness. The residue is refluxed for four hours with 0.75 g. of sodium acetate, 1 ml. of water, 0.4 ml. of glacial acetic acid and 10 ml. of methanol. Ethyl acetate and water are added and the separated and dried organic layer is taken to dryness. The residue is then treated with 1 ml. of acetic anhydride and 1 ml. of pyridine for eighteen hours at room temperature. Removal of these reagents under vacuum and chromatography on neutral alumina affords 21-acetoxy-6α-fluoro-11β-hydroxy-4,17(20)-pregnadiene-3-one.

21-acetoxy-6α-fluoro-11β-hydroxy - 4,17(20) - pregnadiene-3-one (3.70 g.) is heated and stirred at 75–100° C. with 1.1 to 2.2 grams of selenium dioxide in 135 ml. of dioxane and 15 ml. of water. When reaction to form the 21-acetoxy-11β,16α-dihydroxy-4,17(20)-pregnadiene - 3-one is at the maximal the solution is filtered with the aid of Super-cel (an infusorial earth) and taken to dryness. The residue is taken up in ethyl acetate and washed successively with aqueous sodium bicarbonate, ammonium sulfide, dilute aqueous ammonia, dilute hydrochloric acid and finally with water. The organic solvent is dried, treated with activated charcoal, taken to dryness and chromatographed on silica gel to afford 21-acetoxy-6α-fluoro-11β,16α-dihydroxy-4,17(20)-pregnadiene-3-one.

A solution of 21-acetoxy-6α-fluoro-11β,16α-dihydroxy-4,17(20)-pregnadiene-3-one (400 mg.) in 10 ml. of ether and 1 ml. of tributylamine is treated with 0.2 ml. of thionyl chloride. After ten minutes, the solution is poured into iced sodium dihydrogen phosphate and extracted with ethyl acetate. Removal of the dried solvent leaves a residue which contains 21-acetoxy-20-chloro-6α-fluoro-11β-hydroxy-4,16-pregnadiene-3-one. This is dissolved in 10 ml. of ethanol to which 1 N sodium chloride is added dropwise until alkalinity persists over a period of ten minutes. Then acetic acid is carefully added to neutrality and the solvent is removed under vacuum. The residue is dissolved in ethyl acetate, washed with water, and chromatographed on silica gel to afford 20,21-epoxy-6α-fluoro-11β-hydroxy-4,16-pregnadiene-3-one.

To a solution of 200 mg. of 20,21-epoxy-6α-fluoro-11β-hydroxy-4,16-pregnadiene-3-one in 2 ml. of chloroform and 2 ml. of tetrahydrofuran in a polyethylene bottle at −60° C. is added 2 ml. of 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the combined organic solvent is washed with sodium bicarbonate and dried. The residue after removal of solvent is treated at room temperature with one ml. of acetic anhydride and one ml. of pyridine. The reaction mixture is taken to dryness under high vacuum on a rotating evaporator and chromatographed on neutral alumina to afford 21-acetoxy-6α,16α-difluoro-11β-hydroxy-4,17(20)-pregnadiene-3-one.

A solution of 325 mg. of 21-acetoxy-6α,16α-difluoro-11β-hydroxy-4,17(20)-pregnadiene-3-one is prepared in 10 ml. of t-butanol, 3 ml. of methylene chloride and 0.4 ml. of pyridine. To the solution is added 1.1 ml. of a solution of N-methylmorpholine oxide-hydrogen peroxide complex in t-butanol. A milligram of osmium tetroxide is added and the solution is stirred at room temperature over night. Excess reagent is then destroyed by stirring the solution vigorously with aqueous sodium hydrosulfite. After filtration, the organic layer is washed with aqueous sodium dihydrogen phosphate and water, dried and removed under vacuum. Chromatography on Florisil affords 21 - acetoxy-6α,16α-difluoro-11β,17α-dihydroxy-4-pregnene-3,20-dione. Florisil is an activated magnesium silicate made according to U.S. Patent 2,393,625.

The N-methylmorpholine oxide-hydrogen peroxide is prepared by the following procedure: To a solution of 26 grams (0.25 mole) of N-methylmorpholine in 100 milliliters of tertiary butyl alcohol is added 34 grams (0.05 mole) of fifty percent hydrogen peroxide portionwise, with stirring, and while maintaining the reaction temperature at between thirty and 35 degrees centigrade with water bath. The resulting solution is then diluted to 170 millimeters with tertiary butyl alcohol, maintained at room temperature for 48 hours, and then dried with sixty grams of anhydrous magnesium sulfate for an additional 24 hours. The magnesium sulfate is removed by filtration and the filtrate is distilled to dryness to produce crystalline N-methylmorpholine peroxide. Alternatively, the solution can be titrated for available peroxide and the N-methylmorpholine oxide peroxide used without isolation.

Five hundred milligrams of 21-acetoxy-6α,16α-difluoro-11β,17α-dihydroxy-4-pregnene-3,20-dione is dissolved in a mixture of 5 ml. of benzene and 5 ml. of 1 N-methanolic potassium hydroxide and the solution is allowed to stand at room temperature for ten mintues. The solution is then acidified with acetic acid, diluted with ethyl acetate and washed with water. Removal of the dried solvent leaves a residue of 6α,16α-difluoro-11β,17α,21-trihydroxy - 4-pregnene-3,20-dione.

A solution of 400 mg. of 21-acetoxy-6α,16α-difluoro-11β,17α-dihydroxy-4-pregnene-3,20-dione in 2.0 ml. dimethyl formamide, 0.8 ml. of pyridine and 0.4 ml. of methanesulfonyl chloride is allowed to stand at 75° C. for one hour. The mixture is cooled and water is added. The precipitate formed is filtered, washed with water, dried in air and purified by chromatography on alumina and elution with benzene. Crystallization gives 21-acetoxy-6α, 16α-difluoro-17α-hydroxy - 4,9(11) - pregnadiene - 3,20-dione.

To a mixture of 620 mg. of 21-acetoxy-6α,16α-difluoro-17α-hydroxy-4,9(11)-pregnadiene-3,20-dione and 330 mg. of N-bromosuccinimide in 10 ml. of dioxane, and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed under vacuum. About 30 ml of water is added and the product is filtered, washed with water, and dried in air to give 21-acetoxy-9α-bromo-6α, 16α-difluoro-11β,17α-dihydroxy-4-pregnene-3,20-dione.

A solution of 210 mg. of 21acetoxy-9α-bromo-6α,16α-difluoro-11β,17α-dihydroxy-4-pregnene-3,20-dione and 240 mg. of potassium acetate in 10 ml. of absolute ethanol is heated under reflux for two hours. The reaction mixture is cooled to room temperature, and evaporated under vacuum to a small volume. The concentrated aqueous mixture is extracted with three portions of ethyl acetate, and the combined ethyl acetate extracts are washed with water, dried, and evaporated to dryness under vacuum. The residual material is crystallized from a mixture of ethyl acetate and ether to give 21-acetoxy-9α,11β-epoxy-6α,16α-difluoro-17α-hydroxy-4-pregnene-3,20-dione.

To a solution of 200 mg. of 21acetoxy-9α,11β-epoxy-6α,16α-difluoro-17α-hydroxy-4-pregnene-3,20-dione in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization from a mixture of acetone and ether gives 21-acetoxy-6α,9α,16α-trifluoro-11β,17α-dihydroxy-4-pregnene-3,20-dione.

A 500 mg. aliquot of the above compound is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α,16α-difluoro-11β,17α,21-trihydroxy-4-pregnene-3,20-dione.

*Example 3*

9α,11β-dichloro-17α,21-dihydroxy - 4 - pregnene - 3,20-dione (50 g.), is dissolved in 350 ml. of methanol and 2–5 liters of benzene on a steam bath. The steriod is hydrogenated at room temperature and 30 pounds pressure for about 21 hours using as catalyst 45.0 g. of 5% Pd/BaSO₄. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. After standing over night at 5° C. there is obtained 9α,11β-dichloro-17α,21-dihydroxy-5α-pregnane-3,20-dione.

To a suspension of 10 g. of 9α,11β-dichloro-17α,21-dihydroxy-5α-pregnane-3,20-dione in 475 ml. of alcohol-free chloroform and 300 ml. of methylene chloride, cooled to about 5° C. in an ice bath, is added with constant stirring 189 ml. of cold, concentrated hydrochloric acid and then 189 ml. of formalin (low in methanol). The mixture is removed from the ice bath and stirred at room temperature for 2 hours. The layers are separated and the aqueous phase is back-extracted twice with chloroform. The combined organic layers are washed with water, then with a 5% solution of sodium bicarbonate and again with water. The solution is dried over magnesium sulfate and evaporated to dryness under reduced pressure. The residue is flushed three times with methanol. Hot methanol is then added and the product is filtered and then crystallized from a mixture of methylene chloride and n-hexane to give 17α,20,20,21-bis(methylenedioxy)-9α,11β-dichloro-5α-pregnane-3-one.

The 17α,20,20,21-bis(methylenedioxy)-9α,11β-dichloro-5α-pregnane-3-one (500 mg.) is suspended in 8.5 cc. of dry benzene and treated with 0.15 ml. of freshly distilled ethyl formate. The air in the system is replaced with nitrogen and 225 mg. of sodium hydride (as a 58% dispersion in mineral oil is added). The system is again evacuated and filled with nitrogen. The mixture is stirred under nitrogen for ½ hour after which time 0.2 ml. of ethyl formate is added and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as a sodium salt by extraction into a 10% solution of sodium carbonate. The aqueous alkaline extracts are again acidified with an excess of a saturated aqueous solution of sodium dihydrogen phosphate and extracted into ether. The combined organic extracts are dried over sodium sulfate and evaporated to dryness to give 17α,20,20,21-bis(methylenedioxy)-9α,11β-dichloro-2-hydroxymethylene-5α-pregnane-3-one.

The 17α,20,20,21 - bis(methylenedioxy)-9α,11β-dichloro-2-hydroxymethylene-5α-pregnane-3-one (65 mg.) is dissolved in 0.7 ml. of absolute ethanol and treated with a solution of 0.12 ml. of hydrazine hydrate dissolved in 0.12 ml. of absolute ethanol. The mixture is refluxed in a nitrogen atmosphere for about 45 minutes and then evaporated to dryness under reduced pressure. The residue is dissolved in chloroform and petroleum ether is added to give a solid which is 17α,20,20,21-bis(methylenedioxy)-9α,11β-dichloro-5α-pregnano-[3,2-c]pyrazole.

The 17α,20,20,21 - bis(methylenedioxy)-9α,11β-dichloro-5α-pregnano-[3,2-c]pyrazole (25 mg.) is heated on a steam bath with 5 cc. of a 60% aqueous solution of formic acid for about 30 minutes. The excess reagent is removed under reduced pressure using a water bath at about 50° C. as the source of heat. The residue is flushed with n-hexane. The residue is then dissolved in acetone and precipitated with n-hexane to give an amorphous solid which is a mixture of 9α,11β-dichloro-17α,21-dihydroxy-20-oxo-5α-pregnano-[3,2-c]pyrazole and 9α,11β-dichloro-21-formyloxy-17α-hydroxy-20-oxo-5α-pregnano-[3,2-c]pyrazole, which compounds are separated by chromatography. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α,11β-dichloro-17α,21-dihydroxy-20-oxo-5α-pregnano-[3,2-c]pyrazole.

To a solution of 100 mg. of 9α,11β-dichloro-17α,21-dihydroxy-20-oxo-5α-pregnano-[3,2-c]pyrazole in 2 ml. of pyridine is added two milliequivalents of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C., under vacuum. The product is then crystallized from a solvent; alternately, the product may be chromatographed on alumina to give the N-acetyl-9α,11β-dichloro-17α,21-dihydroxy-20-oxo-5α-pregnano-[3,2-c]pyrazole 21-acetate, which is isolated by crystallization of the appropriate eluate.

In accordance with the above procedures, but starting with the 9α,11β-dichloro-17α,21-dihydroxy-20-oxo-5α-pregnano-[3,2-c]pyrazole and using two equivalents of another acylating agent there is obtained the corresponding N-acyl-21-acylate thereof.

A solution of 5.73 g. of N-acetyl-9α,11β-dichloro-17α,21-dihydroxy-20-oxo-5α-pregnano-[3,2-c]pyrazole 21-acetate in 60 ml. of 80% (v./v.) acetic acid is refluxed for 1.5 hours. This solution is diluted with 400 ml. of ice water and extracted with ethyl acetate. The ethyl acetate extract is washed with water and with saturated sodium bicarbonate solution, dried, and evaporated to dryness under vacuum. Recrystallization of the resulting product affords 9α,11β-dichloro-17α,21-dihydroxy-20-oxo-5α-pregnano-[3,2-c]pyrazole 21-acetate.

To a solution of 3.70 g. of 9α,11β-dichloro-17α,21-dihydroxy-20-oxo-5α-pregnano-[3,2-c]pyrazole. 21-acetate in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed under vacuum on the rotating evaporator; more water is added and the precipitate is collected by filtration. Recrystallization from methanol gives the N-carbamyl pyrazole in sufficient purity for the next step.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes The alkoxide is neutralized with acetic acid and the mixture is then taken to dryness and flushed with n-hexane. The residue is washed with water, filtered and dried to constant weight to give N-carbamyl-9α,11β-dichloro-17α,21-dihydroxy-20-oxo-5α-pregnano-[3,2-c]pyrazole.

To a solution of 85 mg. of N-carbamyl-9α,11β-dichloro-17α,21-dihydroxy-20-oxo-5α-pregnano-[3,2-c]pryazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-carbamyl-9α,11β-dichloro-17α,21-dihydroxy-20-oxo-5α-pregnano-[3,2-c]pyrazole 21-mesylate.

To 180 mg. of N-carbamyl-9α,11β-dichloro-17α,21-dihydroxy-20-oxo-5α-pregnano-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl-9α,11β-dichloro-17α-hydroxy-21-iodo-20-oxo-5α-pregnano-[3,2-c]pyrazole.

The N-carbamyl-9α,11β-dichloro-17α-hydroxy-21-iodo-20-oxo-5α-pregnano-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N-carbamyl-9α,11β-dichloro-17α-hydroxy-20-oxo-5α-pregnano-[3,2-c]pyrazole.

To a solution of 62 mg. of N-carbamyl-9α,11β-dichloro-17α,21-dihydroxy-20-oxo-5α-pregnano-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is then added to the cooled solution and the product is extracted into chloroform, dried over sodium sulfate and evaporated to dryness. The resulting product is a mixture of N-carbamyl-9α,11β-dichloro-17α,21-epoxy-20-oxo-5α-pregnano-[3,2-c]pyrazole and N-carbamyl-9α-11β-dichloro-21-fluoro-17α-hydroxy-20-oxo-5α-pregnano-[3,2-c]pyrazole, which compounds are separated by partition chromatography or by chromatography on silica gel.

To a solution of 355 mg. of N-carbamyl-9α,11β-dichloro-17α-hydroxy-20-oxo-5α-pregnano-[3,2-c]pyrazole in 35 ml. of glacial acetic acid there is added slowly with stirring 104 mg. of sodium nitrite in 5 ml. of water. After fifteen minutes at room temperature, most of the acetic acid in removed at room temperature on the rotating evaporator. Ethyl acetate is added and this solution is extracted several times with sodium bicarbonate and then dried. Removal of the solvent, followed by chromatography on alumina, affords 9α-11β-dichloro-17α-hydroxy-20-oxo-5α-pregnano-[3,2-c]pyrazole.

In accordance with the above procedures, but starting with the N-carbamyl-9α-11β-dichloro-21-fluoro-17α-hydroxy-20-oxo-5α-pregnano-[3,2-c]pryazole there is obtained the corresponding 9α,11β-dichloro-21-fluoro-17α-hydroxy-20-oxo-5α-pregnano-[3,2-c]pyrazole.

In accordance with the above procedures, but starting with the 16α-methyl-, or the 6α,16α-dimethyl-9α,11β-dichloro-17α,21-dihydroxy-4-pregnene-3,20-dione in place of the 9α,11β-dichloro-17α,21-dihydroxy-4-pregnene-3,20-dione, there are obtained as products the corresponding 9α-11β-dichloro-16α-methyl-, or 6α,16α-dimethyl-11β-17α,21-trihydroxy-20-oxo-5α-pregnano-[3,2-c]pyrazole and the 21-acylate, and the N-acyl-21-acylate derivatives thereof in which the two acyl groups may be the same or different; the 9α,11β-dichloro-16α-methyl-, or 6α,16α-dimethyl-11β,17α-dihydroxy-20-oxo-5α-pregnano-[3,2-c]pyrazole and the 9α,11β-dichloro-16α-methyl-, or 6α,16α-dimethyl-21α-fluoro-11β,17α-dihydroxy-20-oxo-5α-pregnano-[3,2-c]pyrazole.

The 9α,11β-dichloro-17α,21-dihydroxy-4-pregnene-3,20-dione, as well as the substituted derivatives thereof, including the 16α-methyl-, and the 6α,16α-dimethyl derivatives which are used as starting materials can be obtained in the following manner, starting from the corresponding 17α,21-dihydroxy-4-pregnene-3,20-dione.

A solution of 400 mg. of 17α-21-dihydroxy-4-pregnene-3,20-dione and 2.0 ml. of dimethyl formamide, 0.8 ml. of pyridine and 0.4 ml. of methansulfonyl chloride is allower to stand at 75° C. for one hour. The mixture is cooled and water is added. The precipitate formed is filtered, washed with water, dried in air and purified by chromatography on alumina and elution with benzene. Crystallization gives 17α,21-dihydroxy-4,9(11)-pregnadiene-3,20-dione.

To a solution of 100 mg. of 17α,21-dihydroxy-4,9(11)-pregnadiene-3,20-dione in 2 ml. of pyridine is added one milliequivalent of acetic anhydride. The mixture is allowed to stand over night at room temperature. A mixture of ice and water is then added. After standing for about 30 minutes, the product is extracted with ethyl acetate. The ethyl acetate is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum to afford the 17α,21-dihydroxy-4,9(11)-pregnadiene-3,20-dione-21-acetate which is isolated by the addition of water and filtration.

To a stirred, cooled (0–5° C.) solution of 17α,21-dihydroxy-4,9(11)-pregnadiene-3,20-dione-21-acetate (1.0 g.) and lithium chloride (4.0 g.) in glacial acetic acid (40 ml.) is added N-chlorosuccinimide (383 mg., 1.1 equivalent) followed immediately by an anhydrous solution of hydrogen chloride (104 mg.) in tetrahydrofuran (1.0 ml.).

Stirring is continued at room temperature for 3 hours, and the reaction mixture is poured into water (400 ml.). The resulting mixture is filtered and the residue is washed with water, and dried to yield a crude product. Crystallization from acetone gives 9α,11β-dichloro-17α,21-dihydroxy-4-pregnene-3,20-dione-21-acetate.

A suspension of 9α,11β-dichloro-17α,21-dihydroxy-4-pregnene-3,20-dione-21-acetate (1.0 g.) in 0.27 N methanolic perchloric acid (70 ml.) is stirred at room temperature for 17 hours. The reaction mixture is then poured into water (200 ml.) and filtered. The residue is washed with water and dried, giving a crude product, which is crystallized from acetone to yield 9α,11β-dichloro-17α,21-dihydroxy-4-pregnene-3,20-dione.

*Example 4*

To a solution of 0.5 millimole of 17α,20,20,21-bis(methylenedioxy) - 11β - hydroxy-2-hydroxymethylene-5α-pregnane-3-one (Example 1) in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the 17α,20,20,21 - bis(methylenedioxy) - N - methyl-11β-hydroxy-5α-pregnano-[3,2-c]pyrazole which is formed as the major component is removed by filtration.

Alternately, a mixture of the 1'-methyl- and 2'-methyl-17α,20,20,21 - bis(methylenedioxy) - 11β - hydroxy-5α-pregnano-[3,2-c]pyrazole is prepared by the following route: A mixture of 1 gram of 17α,20,20,21-bis(methylenedioxy) - 11β - hydroxy - 2 - hydroxymethylene-5α-pregnane-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 17α,20,20,21-bis(methylenedioxy) - 11β - hydroxy-2-methoxymethylene-5α-pregnane-3-one is obtained by direct crystallization or by chromatography on acid-washed alumina and elution with ether: chloroform mixtures.

A mixture of 500 mg. of 17α,20,20,21-bis(methylenedioxy)-11β-hydroxy - 2 - methoxymethylene - 5α - pregnane-3-one, 100 ml. of ethanol, and 1 ml. of methylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benzene and ethyl acetate affords the 17α,20,20,21-bis (methylenedioxy)-11β-hydroxy - 1' - methyl - 5α - pregnano-[3,2-c]pyrazole. Further elution with a mixture of 1:1 ether:petroleum ether and crystallization from benzene affords the 17α,20,20,21-bis(methylenedioxy)-11β-hydroxy-2'-methyl-5α-pregnano-[3,2-c]pyrazole.

In accordance with all the above procedures, but using other alkyl substituted hydrazines such as ethyl-, β-hydroxyethyl-, propyl-, butylhydrazines, and the like, in place of methylhydrazine, there are obtained the corresponding 1'-alkyl- and 2'-alkyl-17α-20,20,21-bis(methylenedioxy)-11β-hydroxy-5α-pregnano-[3,2-c]pyrazoles.

The 17α,20,20,21-bis(methylenedioxy)-N-methyl-11β-hydroxy-5α-pregnano-[3,2-c]pyrazoles may be prepared by the following procedure:

The 17α,20,20,21 - bis(methylenedioxy) - 11β - hydroxy - 2 - hydroxymethylene - 5α - pregnane - 3 - one is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for one hour in high vacuum to give 17α,20,20,21-bis(methylenedioxy)-11β-hydroxy-5α-pregnano-[3,2-c]pyrazole.

A solution of about 0.47 millimole of 17α,20,20,21-bis(methylenedioxy) - 11β - hydroxy-5α-pregnano-[3,2-c] pyrazole in 10 ml. of benzene is treated with about 30–38 mg. of about 51% sodium hydride (in oil suspension). After the addition of 2–3 ml. of dimethylformamide (dried over calcium hydride) and 5 ml. of methyl iodide, the mixture is stirred at room temperature over night. The product is filtered, washed with methylene chloride, and the filtrate and washings are taken to dryness. The residue is treated with water and the product is filtered to afford as a major component the 17α,20,20,21-bis(methylenedioxy) - 11β - hydroxy - N - methyl - 5a - pregnano-[3,2-c]pyrazole.

In accordance with the above procedure, but using another alkylating agent, for example, ethyl iodide, propyl iodide and the like, in place of the methyl iodide, there is obtained the corresponding N-alkyl-17α,20,20,21-bis (methylenedioxy) - 11β - hydroxy - 5α-pregnano-[3,2-c] pyrazole.

The 17α,20,20,21-bis(methylenedioxy) - 11β - hydroxy-2' - methyl - 5α - pregnano - [3,2-c]pyrazole (15 mg.) is heated on a steam bath with 1 ml. of 60% formic acid for about 20 minutes and then filtered hot. The filtrate is taken to dryness, water is added, and a mixture of the 11β,17α,21 - trihydroxy - 2' - methyl - 20 - oxo - 5α-pregnano - [3,2 - c]pyrazole and its 21-formate is recovered by filtration. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 11β,17α,21 - trihydroxy - 2' - methyl - 20 - oxo - 5α-pregnano-[3,2-c]pyrazole.

To a solution of 100 mg. of 11β,17α,21-trihydroxy-2'-methyl-20-oxo-5α-pregnano-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The 11β,17α,21-trihydroxy-2'-methyl-20-oxo-5α-pregnano-[3,2-c]pyrazole 21-acetate is then isolated by addition of water and filtration.

In accordance with the above procedure, but using an equivalent quantity of another acylating agent in place of acetic anhydride, there is obtained the corresponding 11β,17α,21-trihydroxy-2'-methyl - 20 - oxo - 5α-pregnano-[3,2-c]pyrazole 21-acylate.

To a solution of 85 mg. of 11β,17α,21-trihydroxy-2'-methyl-20-oxo-5α-pregnano-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give 11β,17α,21-trihydroxy - 2' - methyl - 20 - oxo - 5α-pregnano-[3,2-c]pyrazole 21-mesylate.

To 180 mg. of 11β,17α,21-trihydroxy-2'-methyl-20-oxo-

5α-pregnano-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give 11β,17α-dihydroxy-21-iodo-2'-methyl-20-oxo-5α-pregnano-[3,2-c]pyrazole.

The 11β,17α - dihydroxy - 21 - iodo - 2' - methyl - 20-oxo - 5α - pregnano - [3,2 - c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give 11β,17α-dihydroxy - 2' - methyl - 20 - oxo - 5α - pregnano - [3,2-c]-pyrazole.

To a solution of 62 mg. of 11β,17α,21-trihydroxy-2'-methyl-20-oxo-5α-pregnano-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy-11β-hydroxy-2'-dimethyl-20-oxo-5α-pregnano-[3,2-c]pyrazole and 21-fluoro-11β,17α-dihydroxy-2'-methyl-20 - oxo - 5α - pregnano-[3,2-c]pyrazole, which compounds are separated by partition chromatography, or by chromatography on silica gel.

In accordance with the above procedures beginning with the 2'-methyl-17α,20,20,21-bis - (methylenedioxy)-11β-hydroxy-5α-pregnano-[3,2-c] pyrazole, but using the 1'-methyl-derivative in place of the 2'-methyl-derivative, there are obtained the corresponding 1'-methyl compounds.

In accordance with all of the above procedures, but starting with the 17α,20,20,21-bis(methylenedioxy)-2-hydroxymethylene-4-pregnene-derivative which is obtained from each of the starting materials which are listed in columns 2 and 3 there are obtained the corresponding 1'-methyl- and 2'-methyl derivative.

*Example 5*

The 17α,20,20,21-bis(methylenedioxy)-11β-hydroxy-2-hydroxymethylene-5α-pregnane-3-one (1.900 g.) of Example 1 is dissolved in a mixture of 50 ml. of chloroform and 200 ml. of n-propanol to form solution "A." Phenylhydrazine (2 ml.) is dissolved in 25 ml. of n-propanol to form solution "B." The air in the system is replaced with nitrogen and all solvents are nitrogen flushed. A mixture of 20 ml. of n-propanol and 2.5 ml. of solution "B" are heated to reflux. Then solution "A" and the remainder of solution "B" are added dropwise (ratio A:B 10:1) over a period of 45 minutes. The magnetically stirred solution is kept under a strong reflux. After a total reaction time of 100 minutes the solution is evaporated to dryness under vacuum. The crude reaction product is taken up in ether:methylene chloride (8:1), and is then washed 4 times with 2.5 N hydrochloric acid and 3 times with 2 N potassium hydroxide solution. The mixture of the 1'-phenyl and the 2'-phenyl-17α,20,20,21-bis(methylenedioxy)-11β-hydroxy-5α-pregnano-[3,2-c]pyrazole is separated by chromatography on acid washed alumina to give 735 mg. (33.1%) of crystallized 17α,20,20,21-bis-(methylenedioxy)-11β-hydroxy-1'-phenyl - 5α - pregnano-[3,2-c]pyrazole, M.P. 242–244° C., and 895 mg. (40.3%) of crystallized 17α,20,20,21-bis(methylenedioxy)-11β-hydroxy-2'-phenyl-5α-pregnano - [3,2-c]pyrazole, M.P. 284–285° C.

The following reaction is conducted under nitrogen and all solvents are nitrogen flushed. The 17α,20,20,21-bis(methylenedioxy)-11β-hydroxy-2'-phenyl-5α-pregnano-[3,2-c]pyrazole (500 mg.) is heated on a steam bath with 50 ml. of a 60% aqueous solution of formic acid for 30 minutes. The clear solution is evaporated to dryness under vacuum. After twice flushing with benzene the resulting white foam is dissolved in 30 ml. of pure methanol and allowed to react with 27 mg. of sodium methylate at room temperature for 15 minutes. The sodium alkoxide is destroyed with a slight excess of acetic acid and the mixture is subsequently taken to dryness under vacuum. After flushing 4 times with benzene, 535 mg. of semi-crystalline material is obtained. An aliquot (280 mg.) is dissolved in ether:methylene chloride (10:1) and the solution is washed twice with saturated sodium bicarbonate solution and once with water. The 11β,17α,21-trihydroxy-20-oxo-2'-phenyl-5α-pregnano - [3,2-c]pyrazole (230 mg) is obtained.

A solution of 225 mg. of 11β,17α,21-trihydroxy-20-oxo-2'-phenyl-5α-pregnano-[3,2-c]pyrazole in 20 ml. of pyridine acetic anhydride (1:1) is kept over night at room temperature. The reaction mixture is then evaporated to dryness under vacuum and flushed with benzene 3 times and n-hexane 2 times. The resulting product is dissolved in a mixture of methylene chloride in benzene and washed 3 times with 2.5 N hydrochloric acid, 2 times with sodium bicarbonate solution and 2 times with water. The product (226 mg) is purified by chromatography on 6.5 g. of neutral alumina. After crystallization from a mixture of methylene chloride and isopropanol, 128 mg. of white crystalline 11β,17α,21-trihydroxy-20-oxo-2' - phenyl - 5α-pregnano-[3,2-c]pyrazole 21-acetate, M.P. 247–249°, is obtained.

The 11β,17α,21-trihydroxy-20-oxo-2'-phenyl-5α - pregnano-[3,2-c]pyrazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium sulfate and taken to dryness to afford the 11β,17α,21-trihydroxy-6α-methyl-20-oxo-2'-phenyl-5α-pregnano - [3,2-c]pyrazole 21-mesylate.

The 11β,17α,21-trihydroxy-20-oxo-2'-phenyl-5α - pregnano-[3,2-c]pyrazole 21-mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the 11β,17α-dihydroxy-21-iodo-20-oxo-2'-phenyl - 5α - pregnano-[3,2-c]pyrazole.

The above material is dissolved in 5 cc. of ethanol. Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give a residue which is purified by chromatography on silica gel. The 11β,17α-dihydroxy-20-oxo-2'-phenyl-5α-pregnano-[3,2-c]pyrazole so obtained is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 11β,17α-dihydroxy-21-iodo-20-oxo-2'-phenyl-5α-pregnano-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give 11β,17α-dihydroxy-20-oxo-2'-phenyl-5α-pregnano-[3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 62 mg. of 11β,17α,21-trihydroxy-20-oxo-2'-phenyl-5α-pregnano-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy-11β-hydroxy-20-oxo-2'-phenyl-5α-pregnano-[3,2-c]pyrazole and 21-fluoro-11β,17α-dihydroxy-20-oxo-2'-phenyl-5α-pregnano-[3,2-c]pyrazole, which compounds are separated by partition chromatography, or by chromatography on silica gel.

In accordance with the above procedures beginning with the 2'-phenyl-17α,20,20,21-bis(methylenedioxy)-11β-hydroxy-5α-pregnano-[32-c]pyrazole, but using the 1'-phenyl-derivatives in place of the 2'-phenyl-derivatives, there are obtained the corresponding 1'-phenyl-compounds.

In accordance with all of the above procedures, but starting with the 17α,20,20,21-bis(methylenedioxy)-2-hydroxymethylene-4-pregnene-derivative which is obtained from each of the starting materials which are listed in columns 2 and 3, there are obtained the corresponding 1'-phenyl- and 2'-phenyl-derivatives.

*Example 6*

A 11.5 mg. sample of 17α,20,20,21-bis(methylenedioxy)-11β-hydroxy-2-hydroxymethylene-5α-pregnane-3-one (Example 1) is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum to give a residue which has as its major component the 17α,20,20,21-bis(methylenedioxy)-2'-(p-fluorophenyl)11β-hydroxy-5α-pregnano-[3,2-c]pyrazole. The latter compound is recovered by dissolving the reaction mixture in methanol and then recrystallizing.

Alternately, a mixture of the 1'-(p-fluorophenyl)- and the 2'-(p-fluorophenyl)-17α,20,20,21-bis(methylenedioxy)-11β-hydroxy-5α-pregnano-[3,2-c]pyrazole is prepared by the following route: A mixture of 1 gram of 17α,20,20,21-bis(methylenedioxy)-11β-hydroxy-2-hydroxy-methylene-5α-pregnane-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 17α,20,20,21-bis(methylenedioxy)-11β-hydroxy-2-methoxymethylene-5α-pregnane-3-one is obtained by direct crystallization or by chromatography on acid-washed alumina and elution with ether: chloroform mixtures.

A mixture of 500 mg. of 17α,20,20,21-bis(methylenedioxy)-11β-hydroxy-2-methoxymethylene-5α-pregnane-3-one, 100 ml. of ethanol, and 1 ml. of p-fluorophenyl-hydrazine is heated under nitrogen until dissolved, and then allowed to stand under nitrogen at room temperature overnight. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benzene and ethyl acetate affords the 17α,20,20,21-bis(methylenedioxy)-11β-hydroxy-1'-fluorophenyl-5α-pregnano-[3,2-c]pyrazole. Further elution with a mixture of 1:1 ether:petroleum ether, and crystallization from benzene, affords the 17α,20,20,21-bis(methylenedioxy)-11β-hydroxy-2'-(p-fluorophenyl)-5α-pregnano-[3,2-c]pyrazole.

A 70 mg. aliquot of 17α,20,20,21-bis(methylenedioxy)-2'-fluorophenyl)-11β-hydroxy-5α-pregnano-[3,2-c]pyrazole is heated on a steam bath with 2 ml. of a 60% solution of formic acid for 35 minutes. The excess reagent is removed under vacuum using a water bath at about 50° C. The residue is thoroughly washed with water and then dried at 80° C. to give 61.1 mg. of residue. The crude product is dissolved in 3 ml. of spectral grade methanol and allowed to react with 0.5 ml. of a 0.1 N solution of sodium methoxide in methanol at room temperature for 10 minutes. The product is neutralized with acetic acid. The mixture is then taken to dryness and washed throughly with water, filtered and dried to constant weight to give 11β,17α,21-trihydroxy-2'-(p-fluorophenyl)-20-oxo-5α-pregnano-[3,2-c]pyrazole.

To a solution of 100 mg. of 11β,17α,21-trihydroxy-2'-(p-fluorophenyl)-20-oxo-5α-pregnano-[3,2-c]pyrazole in 2 ml. of pyridine is added one milliequivalent of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum to afford 11β,17α,21-trihydroxy-2'-(p-fluorophenyl)-20-oxo-5α-pregnano-[3,2-c]pyrazole 21-acetate which is isolated by the addition of water and filtration. After drying, the compound is dissolved in methylene chloride, a few drops of 2.5 N HCl are added and the mixture is taken to dryness. The resulting hydrochloride salt is crystallized from acetone.

The 21-dihydrogen phosphate esters and the mono- and dialkali metal salts thereof are prepared by the procedure given in detail in columns 28 and 29, for the corresponding 2'-phenylsteroid.

In accordance with the above procedure, but using an equivalent quantity of another acylating agent in place of acetic anhydride, there is obtained the corresponding 21-acylate.

To a solution of 85 mg. of 2'-(p-fluorophenyl)-11β,17α,21 - trihydroxy - 20-oxo - 5α - pregnano - [3,2-c]pyrazole in 0.5 ml. of pyridine, cooled to 0° C., is added 0.015 ml. of methane sulfonyl chloride. The resulting mixture is allowed to stand at a temperature of approximately 0° C for a period of approximately 1 hour. Water is then added to the reaction mixture and the crystalline precipitate which forms is recovered by filtration, washed with water, and dried to give 2'-(p-fluorophenyl)-11β,17α,21 - trihydroxy - 20 - oxo - 5α - pregnano-[3,2-c]pyrazole 21-mesylate.

To 180 mg. of 2'-(p-fluorophenyl)-11β,17α,21-trihydroxy-20-oxo-5α-pregnano - [3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered by filtration, washed with water, and dried to give 2'-(p-fluorophenyl)-11β,17α-dihydroxy-21-iodo-20-oxo-5α-pregnano-[3,2-c]pyrazole.

The 2'-(p-fluorophenyl)-11β,17α-dihydroxy-21-iodo-20-oxo-5α-pregnano-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the crystalline material which separates is recovered by filtration. The product is washed with water, dried and recrystallized from ethyl acetate to give 2'-(p-fluorophenyl) - 11β,17α - dihydroxy-20-oxo-5α-pregnano-[3,2-c]pyrazole.

To a solution of 62 mg. of 2'-(p-fluorophenyl)-11β,17α,21-trihydroxy - 20 - oxo-5α-pregnano-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 2'-(p-fluorophenyl) - 17α,21-epoxy - 11β-hydroxy-20-oxo-5α-pregnano-[3,2-c]pyrazole and 2'-(p-fluorophenyl)-21-fluoro-11β,17α - dihydroxy-20-oxo-5α - pregnano-[3,2-c]pyrazole which compounds are separated by partition chromatography.

In accordance with the above procedures beginning with the 2'-(p-fluorophenyl)-17α,20,20,21-bis(methylenedioxy)-11β-hydroxy-5α-pregnano - [3,2-c]pyrazole, but using the 1'-(p-fluorophenyl)-derivative in place of the 2'-(p-fluorophenyl)-derivative, there are obtained the corresponding 1'-(p-fluorophenyl)-compounds.

In accordance with all of the above procedures, but starting with the 17α,20,20,21-bis(methylenedioxy)-2-hydroxymethylene-4-pregnene derivative which is obtained from each of the starting materials which are listed in columns 2 and 3 there are obtained the corresponding 1' - (p - fluorophenyl)- and 2' - (p - fluorophenyl)-derivatives.

*Example 7*

In order to remove any formate esters which may be formed during the preparation of the 2-hydroxymethylene-derivative by reaction of the steroid with ethyl formate and sodium hydride the following procedure is employed.

The steroid (4 g.) is refluxed for about 2 hours under nitrogen with 60 cc. of a mixture of 1.8 g. of potassium hydroxide in 100 ml. of ethanol. The ethanol is taken off under reduced pressure. About 75 cc. of methylene chloride and 25 cc. of saturated sodium chloride solution are added and the product is then washed with saturated sodium chloride until neutral. The steroid product containing the free hydroxyl group is then dried over magnesium sulfate and taken to dryness.

*Example 8*

Lithium wire (0.9 g.) is dissolved in approximately 100 ml. of ammonia. A slurry of 19.8 grams of 17α,20,20,21-bis(methylenedioxy)-6α,16α - dimethyl-4-pregnene-3-one (U.S.P. 2,940,968, Example 11) in tetrahydrofuran is added. The mixture is allowed to stir under a dried ice condenser for 2½ hours, after which the methanol is added and the ammonia is allowed to evaporate. The product is distributed between chloroform and water and the chloroform extracts are washed with water, dried over anhydrous magnesium sulfate and concentrated under vacuum to a crystalline residue (20.4 grams), chromatographed over alkaline alumina and elution with a mixture of 30% chloroform in ether affords 9.7 g. of 17α,20,20,21-bis(methylenedioxy) - 6α,16α - dimethyl-5α-pregnane-3-one.

A mixture of 1.2 g. of sodium hydride as a 53% dispersion in mineral oil, 40 ml. of absolute benzene, and 1.2 ml. of absolute t-butanol are stirred together under nitrogen at room temperature for 20 minutes. This mixture is then added to a solution of 3.800 g. of 17α,20,20,21 - bis(methylenedioxy) - 6α,16α-dimethyl-5α-pregnane-3-one in a mixture of 150 ml. of absolute benzene and 7 ml. of freshly distilled ethyl formate. Reaction mixture is stirred under nitrogen at room temperature over night and then poured into water. The basic aqueous solution is extracted once with a mixture of benzene and ether (1:1), and once with ether. The organic layers are washed once with a 2 N-potassium hydroxide solution. The combined base extracts are ice cooled and acidified with 18% hydrochloric acid. The product is back extracted with ethyl acetate to give 3.75 g. of semicrystalline material. One crystallization from ether yields 3.04 g. of crystalline 17α,20,20,21-bis(methylenedioxy)-6α,16α-dimethyl-2-hydroxymethylene-5α - pregnane - 3-one.

A 11.5 mg. sample of 17α,20,20,21-bis(methylenedioxy)-6α,16α-dimethyl-2-hydroxymethylene - 5α-pregnane-3-one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2,5 N-hydrochloric acid, then three times with 2.5 N sodium hydroxide and finally with water. The ether layer is dried over magnesium sulfate, filtered and concentrated to dryness under vacuum to give a residue which has as its major component the 17α,20,20,21-bis(methylenedioxy)-2'-(p-fluorophenyl)-6α,16α-dimethyl-5α-pregnano - [3,2-c]pyrazole. The latter compound is recovered by dissolving the reaction mixture in methanol and then recrystallizing.

Alternately, a mixture of the 1'-(p-fluorophenyl)- and the 2'-(p-fluorophenyl)-17α,20,20,21 - bis(methylenedioxy)-6α,16α-dimethyl-5α-pregnano - [3,2-c]pyrazone is prepared by the following route: A mixture of 1 gram of 17α,20,20,21-bis(methylenedioxy) - 6α,16α - dimethyl-2-hydroxymethylene-5α-pregnane-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 17α,20,20,21-bis(methylenedioxy)-2-methoxymethylene-6α,16α-dimethyl-5α-pregnane-3-one is obtained by direct crystallization or by chromatography on acid-washed alumina and elution with ether:chloroform mixtures.

A mixture of 500 mg. of 17α,20,20,21-bis(methylenedioxy)-2-methoxymethylene - 6α,16α - dimethyl-5α-pregnane-3-one, 100 ml. of ethanol, and 1 ml. of p-fluorophenyl-hydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benzene and ethyl acetate affords the 17α,20,20,21-bis(methylenedioxy)6α,16α - dimethyl - 1' - fluorophenyl-5α-pregnano-[3,2-c]pyrazole. Further elution with a mixture of 1:1 ether:petroleum ether, and crystallization from benzene, affords the 17α,20,20,21bis-(methylenedioxy)-6α,16α - dimethyl-2'-(p-fluorophenyl)-5α-pregnano-[3,2-c]pyrazole.

A 70 mg. aliquot of 17α,20,20,21-bis-(methylenedioxy)-2'-(p-fluorophenyl) - 6α,16α - dimethyl - 5α - pregnano-[3,2-c]pyrazole is heated on a steam bath with 2 ml. of a 60% solution of formic acid for 35 minutes. The excess reagent is removed under vacuum using a water bath at about 50° C. The residue is thoroughly washed with water and then dried at 80° C. to give 61.1 mg. of residue. The crude product is dissolved in 3 ml. of spectral grade methanol and allowed to react with 0.5 ml. of a 0.1 N solution of sodium methoxide in methanol at room temperature for 10 minutes. The product is neutralized with acetic acid. The mixture is then taken to dryness and washed thoroughly with water, filtered and dried to constant weight to give 17α,21-dihydroxy-6α,16α-dimethyl-2'-(p-fluorophenyl) - 20-oxo-5α-pregnano-[3,2 - c]pyrazole.

To a solution of 100 mg. of 17α,21-dihydroxy-6α,16α-dimethyl-2'-(p - fluorophenyl) - 20 - oxo-5α-pregnano-[3,2-c]pyrazole in 2 ml. of pyridine is added one milliequivalent of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N-sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum to afford 17α,21-dihydroxy-2'-(p-fluorophenyl)-6α,16α - dimethyl-20-oxo-5α-pregnano-[3,2-c]pyrazole 21-acetate which is isolated by the addition of water and filtration. After drying, the compound is dissolved in methylene chloride, a few drops of 2.5 N HCl are added and the mixture is taken to dryness. The resulting hydrochloride salt is crystallized from acetone.

The 21-dihydrogen phosphate esters and the mono- and dialkali metal salts thereof are prepared by the procedure given in detail in columns 28 and 29 for the corresponding 2'-phenylsteroid.

In accordance with the above procedure, but using an equivalent quantity of another acylating agent in place of acetic anhydride, there is obtained the corresponding 21-acylate.

To a solution of 85 mg. of 2'-(p-fluorophenyl)-17α,21-dihydroxy-6α,16α-dimethyl-20-oxo-5α-pregnano - [3,2-c] pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the crystalline precipitate which forms is recovered by filtration, washed with water, and dried to give 2'-(p-fluorophenyl)-17α,21-dihydroxy-6α,16α-dimethyl-20-oxo-5α-pregnano - [3,2-c] pyrazole 21-mesylate.

To 180 mg. of 2'-(p-fluorophenyl)-17α,21-dihydroxy-6α,16α-dimethyl-20-oxo-5α-pregnano-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered by filtration, washed with water, and dried to give 2'-(p-fluorophenyl)-17α-hydroxy-21-iodo-6α,16α-dimethyl-20-oxo-5α - pregnano-[3,2-c]pyrazole.

The 2' - (p-fluorophenyl)-17α-hydroxy-21-iodo-6α,16α-dimethyl-20-oxo-5α-pregnano-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the crystalline material which separates is recovered by filtration. The product is washed with water, dried and recrystallized from ethyl acetate to give 2'-(p-fluorophenyl)-17α-hydroxy-6α,16α-dimethyl-20-oxo-5α-pregnano-[3,2-c]pyrazole.

To a solution of 62 mg. of 2'-(p-fluorophenyl)-17α,21-dihydroxy - 6α,16α - dimethyl-20-oxo-5α-pregnano-[3,2-c] pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 2'-(p-fluorophenyl)-17α,21-epoxy-6α,16α-dimethyl-20-oxo-5α-pregnano-[3,2-c]pyrazole and 2'-(p-fluorophenyl)-21-fluoro - 17α - hydroxy-6α,16α-dimethyl-20-oxo-5α-pregnano-[3,2-c]pyrazole which compounds are separated by partition chromatography.

Various changes and modifications may be made in carrying out the present invention without departing from the spirit and scope thereof. Insofar as these changes and modifications are within the purview of the annexed claims, they are to be considered as part of our invention.

We claim:

1. A compound selected from the group consisting of compounds having structural Formulas A and B:

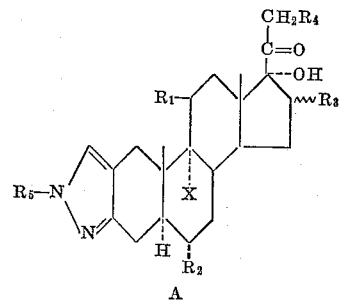

A

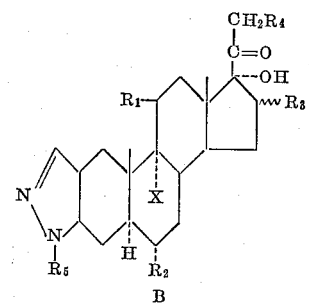

B wherein $R_1$ is a member of the group consisting of hydrogen, β-halogen, β-hydroxy and keto, but β-halogen is present at $R_1$ only when X is halogen, $R_2$ is a member of the group consisting of hydrogen, α-fluoro and α-methyl, $R_3$ is a member of the group consisting of hydrogen, α-methyl, β-methyl and α-fluoro, $R_4$ is a member of the group consisting of hydrogen, hydroxy, lower hydrocarbon carboxylic acyloxy, fluoro, iodo, the dihydrogen phosphate and the alkali metal salts of said dihydrogen phosphate, and the methylsulfonyloxy-radical, $R_5$ is a member of the group consisting of hydrogen, lower alkyl, lower aralkyl, lower hydrocarbon aryl, halophenyl, lower alkoxy phenyl, nitrophenyl, pyridyl, pyridyloxide and pyrimidyl, and X is a member of the group consisting of hydrogen and halogen, and pharmacologically acceptable salts of the foregoing compounds.

2. 9α-fluoro - 11β,17α,21 - trihydroxy - 16α - methyl-20-oxo-2'(p-fluorophenyl)-5α-pregnano-[3,2-c]pyrazole.

3. 11β,17α,21 - trihydroxy - 16α - methyl-20-oxo-2'-(p-fluorophenyl)-5α-pregnano-[3,2-c]pyrazole.

4. 9α,11β-dichloro - 11β,17α,21 - trihydroxy-20-oxo-2'-(p-fluorophenyl)-5α-pregnano-[3,2-c]pyrazole.

5. 9α,11β-dichloro - 11β,17α,21 - trihydroxy-6α,16α-dimethyl - 20 - oxo-2'-(p-fluorophenyl)-5α-pregnano-[3,2-c]pyrazole.

6. 11β,17α - dihydroxy - 16α - methyl - 20 - oxo-2'-(p-fluorophenyl)-5α-pregnano-[3,2-c]pyrazole.

7. 9α-fluoro - 11β,17α - dihydroxy - 6α - methyl-20-oxo-2'-(p-fluorophenyl)-5α-pregnano-[3,2-c]pyrazole.

8. 6α,9α,16α-trifluoro - 11β,17α - dihydroxy-20-oxo-2'-(p-fluorophenyl)-5α-pregnano-[3,2-c]pyrazole.

9. 6α,9α-difluoro - 11β,17α,21 - trihydroxy-16β-methyl-20-oxo-2'-(p-fluorophenyl)-5α-pregnano-[3,2-c]pyrazole.

10. 9α-fluoro - 11β,17α,21 - trihydroxy-16α-methyl-20-oxo-2'-phenyl-5α-pregnano-[3,2-c]pyrazole.

11. 11β,17α,21-trihydroxy - 16α - methyl - 20 - oxo-2'-phenyl-5α-pregnano-[3,2-c]pyrazole.

12. 9α,11β - dichloro - 11β,17α,21 - trihydroxy-20-oxo-2'-phenyl-5α-pregnano-[3,2-c]pyrazole.

13. 9α,11β - dichloro - 11β,17α-21 - trihydroxy-6α,16α-dimethyl-20-oxo-2'-phenyl-5α-pregnano-[3,2-c]pyrazole.

14. 11β,17α-dihydroxy - 16α - methyl-20-oxo-2'-phenyl-5α-pregnano-[3,2-c]pyrazole.

15. 9α - fluoro - 11β,17α - dihydroxy-6α-methyl-20-oxo-2'-phenyl-5α-pregnano-[3,2-c]pyrazole.

16. 6α,9α,17α-trifluoro - 11β,17α - dihydroxy-20-oxo-2'-phenyl-5α-pregnano-[3,2-c]pyrazole.

17. 6α,9α-difluoro - 11β,17α,21 - trihydroxy-16β-methyl-20-oxo-2'-phenyl-5α-pregnano-[3,2-c]pyrazole.

18. 17α,21 - dihydroxy - 6α,16α - dimethyl-20-oxo-2'-p-fluorophenyl-5α-pregnano-[3,2-c]pyrazole.

References Cited in the file of this patent
UNITED STATES PATENTS 2,945,852    Bergstrom _____ July 19, 1960